(12) United States Patent
Kawahara et al.

(10) Patent No.: US 11,479,497 B2
(45) Date of Patent: Oct. 25, 2022

(54) APPLICATION EQUIPMENT FOR APPLYING MOLD RELEASE LUBRICANT TO GLASS BOTTLE FORMING MOLDS

(71) Applicant: Nihon Yamamura Glass Co., Ltd., Hyogo (JP)

(72) Inventors: Ryusuke Kawahara, Amagasaki (JP); Shota Ishiguro, Amagasaki (JP); Takahiro Nishimura, Amagasaki (JP); Ryu Wada, Amagasaki (JP); Kunikazu Oonishi, Amagasaki (JP); Hiroshi Ikeda, Amagasaki (JP); Hiroshi Nakajima, Amagasaki (JP); Masahiro Seto, Amagasaki (JP)

(73) Assignee: Nihon Yamamura Glass Co., Ltd., Hyogo (JP)

( * ) Notice: Subject to any disclaimer, the term of this patent is extended or adjusted under 35 U.S.C. 154(b) by 0 days.

(21) Appl. No.: 17/040,616

(22) PCT Filed: Dec. 27, 2019

(86) PCT No.: PCT/JP2019/051434
§ 371 (c)(1),
(2) Date: Sep. 23, 2020

(87) PCT Pub. No.: WO2020/138423
PCT Pub. Date: Jul. 2, 2020

(65) Prior Publication Data
US 2021/0047228 A1    Feb. 18, 2021

(30) Foreign Application Priority Data

Dec. 27, 2018 (JP) .............................. JP2018-244875

(51) Int. Cl.
*C03B 40/027* (2006.01)
*C03B 9/41* (2006.01)
(Continued)

(52) U.S. Cl.
CPC ............ *C03B 40/027* (2013.01); *C03B 9/347* (2013.01); *C03B 9/3816* (2013.01); *C03B 9/41* (2013.01)

(58) Field of Classification Search
CPC ....................... C03B 40/027; C03B 9/30–48
See application file for complete search history.

(56) References Cited

U.S. PATENT DOCUMENTS 3,642,401 A * 2/1972 Wilson ................ B29C 45/7626
425/173
4,104,046 A * 8/1978 McCreery ............ C03B 9/3825
65/161

(Continued)

FOREIGN PATENT DOCUMENTS

CN      104475303 A      4/2015
FR      2901551 A1 *   11/2007 ........... C03B 40/027

(Continued)

OTHER PUBLICATIONS

English language machine translation of FR-2901551-A1.*

(Continued)

*Primary Examiner* — Erin Snelting
(74) *Attorney, Agent, or Firm* — Studebaker & Brackett PC

(57) ABSTRACT

A mold release lubricant application equipment 4 comprises application portions 30A, 30B for applying a mold release lubricant to glass bottle forming molds 10, 18, and an application control portion 31 for operating the application portions 30A, 30B. Molds 10,18 are arranged independently along a predetermined arrangement direction A1. A plurality of sections 5 comprising molds 10, 18 are formed along the arrangement direction A1. The application portions 30A, 30B comprise lubricant application parts 38A, 38B for applying the mold release lubricant, a transport mechanisms 33A, 33B for moving the lubricant application parts 38A, (Continued)

38B among the plurality of the sections along the arrangement direction A1, and sensors 42A, 42B. The application control portion 31 detects abnormalities with the sensors 42A, 42B on a plurality of sections 5.

5 Claims, 15 Drawing Sheets

(51) Int. Cl.
*C03B 9/347* (2006.01)
*C03B 9/38* (2006.01)

(56) References Cited

U.S. PATENT DOCUMENTS

| | | | | |
|---|---|---|---|---|
| 4,236,181 A * | 11/1980 | Shibata | ............ | G01V 8/20 |
| | | | | 250/559.46 |
| 4,266,961 A * | 5/1981 | Wood | ............ | G05B 19/045 |
| | | | | 700/15 |
| 4,548,633 A * | 10/1985 | Nebelung | ............ | G01J 5/047 |
| | | | | 65/159 |
| 4,603,329 A * | 7/1986 | Bangerter | ............ | G07C 3/00 |
| | | | | 340/674 |
| 4,675,042 A * | 6/1987 | Taddei-Contreras | ... | C03B 40/00 |
| | | | | 65/165 |
| 4,841,364 A * | 6/1989 | Kosaka | ............ | B29C 45/7626 |
| | | | | 348/130 |
| 4,990,171 A * | 2/1991 | Kojima | ............ | C03B 40/027 |
| | | | | 65/169 |
| 5,597,396 A * | 1/1997 | Tohjo | ............ | C03B 40/027 |
| | | | | 65/169 |
| 5,938,806 A * | 8/1999 | Mine | ............ | C03B 40/027 |
| | | | | 65/68 |
| 6,592,354 B2 * | 7/2003 | Kachnic | ............ | B29C 45/7626 |
| | | | | 425/169 |
| 7,033,159 B2 * | 4/2006 | Kachnic | ............ | B29C 45/7626 |
| | | | | 425/169 |
| 8,240,171 B2 * | 8/2012 | Balbi | ............ | B08B 9/00 |
| | | | | 65/168 |
| 10,252,929 B2 * | 4/2019 | Vorspel | ............ | C03B 9/40 |
| 10,494,287 B2 * | 12/2019 | Vorspel | ............ | C03B 9/447 |
| 2009/0173105 A1 | 7/2009 | Zanella et al. | | |
| 2009/0241601 A1 | 10/2009 | Balbi | | |
| 2012/0261850 A1 * | 10/2012 | Simon | ............ | B29C 49/4823 |
| | | | | 264/40.6 |
| 2016/0184853 A1 | 6/2016 | Jing | | |
| 2017/0197860 A1 * | 7/2017 | Vorspel | ............ | C03B 11/16 |
| 2017/0197861 A1 * | 7/2017 | Vorspel | ............ | C03B 40/027 |

FOREIGN PATENT DOCUMENTS

| | | |
|---|---|---|
| JP | S62-003027 A | 1/1987 |
| JP | H06-099155 B2 | 12/1994 |
| JP | 2010-269945 A | 12/2010 |
| JP | 5118131 B2 | 1/2013 |
| JP | 2017-534565 A | 11/2017 |
| JP | 6277308 B1 | 2/2018 |
| WO | 2016/039997 A1 | 3/2016 |

OTHER PUBLICATIONS

International Search Report issued in PCT/JP2019/051434; dated Feb. 10, 2020.
"Notice of Reasons for Refusal" Office Action issued in JP 2018-244875; mailed by the Japanese Patent Office dated Mar. 26, 2019.
"Decision to Grant" Office Action issued in JP 2018-244875; mailed by the Japanese Patent Office dated Aug. 6, 2019.
The extended European search report issued by the European Patent Office dated Jul. 4, 2022, which corresponds to European Patent Application No. 19902658.4-1105 and is related to U.S. Appl. No. 17/040,616.

\* cited by examiner

Regular cycle lubricant application operation (1/2)

Regular cycle lubricant application operation (2/2)

Step A5

Spray confirmation equipment diagnosis before spraying

Step A7

Glass residual detecting

Step A13

Spray confirmation equipment diagnosis after spraying

Monitoring mode

APPLICATION EQUIPMENT FOR APPLYING MOLD RELEASE LUBRICANT TO GLASS BOTTLE FORMING MOLDS

FIELD OF THE INVENTION

This invention relates to a mold release lubricant application equipment for glass bottle blow forming molds.

BACKGROUND OF THE INVENTION

Equipment for spraying a mold release lubricant on blank molds of the glass bottle forming molds is known technology (refer to Patent Literature 1, 2).

PRIOR ART

Patent Literature

[Patent Literature 1] JP 5118131
[Patent Literature 2] JP 6277308

SUMMARY OF THE INVENTION

Problem to be Solved by the Invention

A glass bottle forming mold comprises a blank mold and a blow mold. Furthermore, the blank mold forms a gob (a lump of molten glass) into a parison and the blow mold forms the parison into a glass bottle.

There is a need to apply the mold release lubricant to a blank mold cavity (forming surface) and a blow mold cavity (forming surface) in order to ensure slipperiness and releasability for the glass being formed. However, Patent Literature 1 and 2 merely disclose a structure that sprays the mold release lubricant onto the blank mold.

This invention aims to provide an application equipment for applying the mold release lubricant to the glass bottle forming molds.

Means for Solving the Problem

One aspect of this invention relates to a mold release lubricant application equipment for glass bottle forming molds, comprising:
application portions for applying the mold release lubricant to the glass bottle forming molds, and an application control portion that operates the application portions; wherein
the molds are arranged independently along a predetermined arrangement direction;
a plurality of sections comprising the molds are formed along the arrangement direction; the application portions comprise lubricant application parts for applying the mold release lubricant to the molds, transport mechanisms for moving the lubricant application parts among the plurality of the sections along the arrangement direction, and sensors; and
the application control portion detects abnormalities in the plurality of sections using the sensors.

Another aspect of this invention relates to a mold release lubricant application equipment for glass bottle forming molds, comprising:
an application portions for applying mold release lubricant to the glass bottle forming molds, and an application control portion that operates the application portions; wherein
the application portions are structured to spray the mold release lubricant onto the molds,
the application portions comprise abnormal spray detecting portions to check for any spray abnormality of the mold release lubricant in the application portion, and
the application control portion notifies an abnormality, when the abnormal spray detecting portion detects the spray abnormality.

Another aspect of this invention relates to a mold release lubricant application equipment for glass bottle forming molds, comprising:
a first application portion for applying a mold release lubricant to blank molds for glass bottle forming,
a second application portion for applying the mold release lubricant to blow molds for the glass bottle forming, and
an application control portion that operates the first application portion and the second application portion in association with each other; wherein
the plurality of the blank molds are arranged independently along a predetermined arrangement direction;
the plurality of the blow molds are arranged independently along the arrangement direction;
the first application portion comprises a first lubricant application part for applying the mold release lubricant, and a first transport mechanism for moving the first lubricant application part among the plurality of the blank molds along the arrangement direction;
the second application portion comprises a second lubricant application part for applying the mold release lubricant, and a second transport mechanism for moving the second lubricant application part among the plurality of the blow molds along the arrangement direction;
a plurality of sections comprising the blank molds and the blow molds are formed along the arrangement direction; and
the application control portion is configured so as to execute an application operation, wherein both the first application portion and the second application portion apply the mold release lubricant, and wherein either of the first application portion or the second application portion applies the mold release lubricant.

BRIEF DESCRIPTION OF THE DRAWINGS

Similar to FIG. 10.

DESCRIPTION OF THE EMBODIMENTS

A description of the embodiment of the present invention is provided below referring to the figures.

Figure 1:
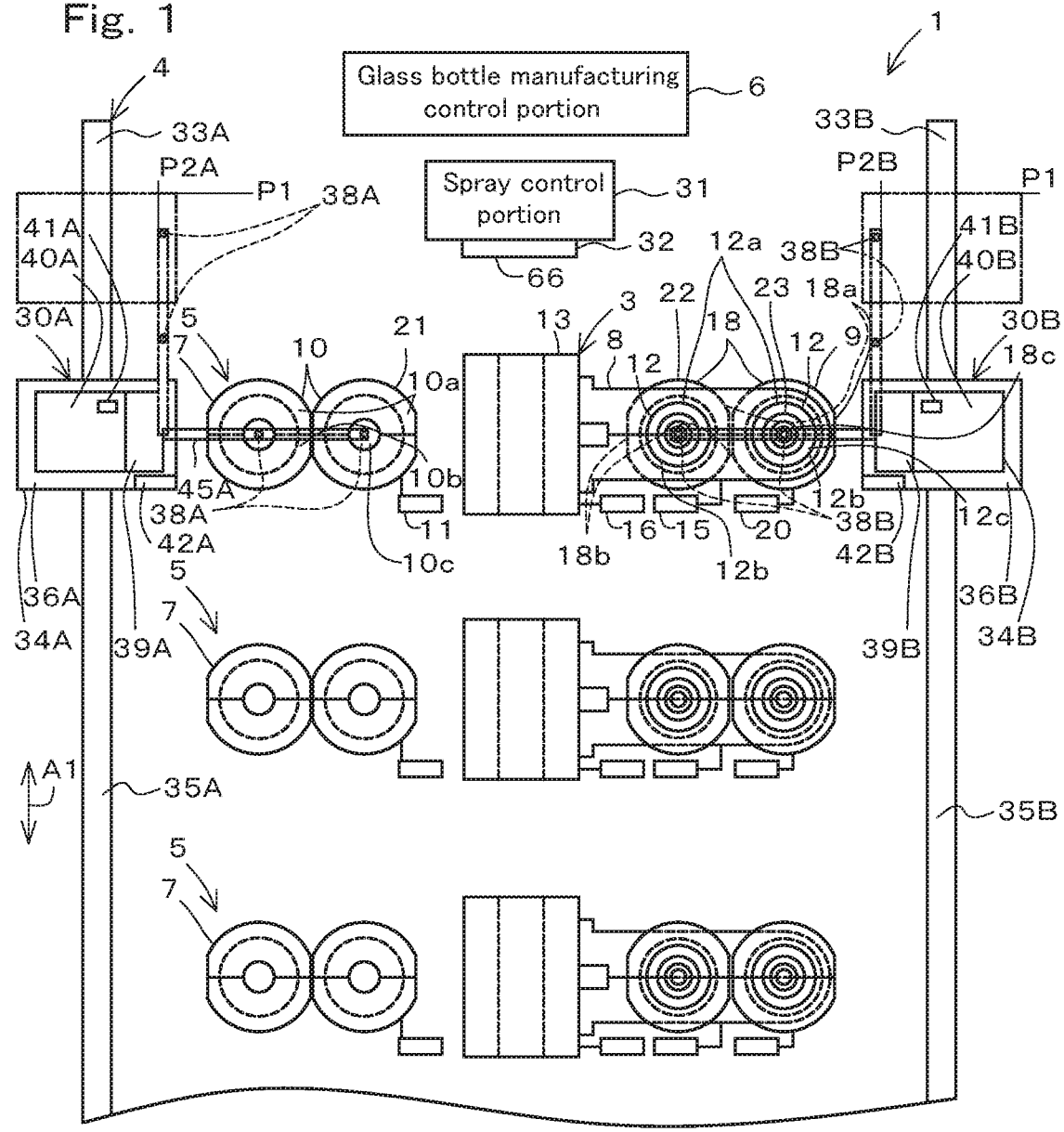
FIG. 1 is a schematic plain view of a glass bottle manufacturing equipment according to one embodiment of the present invention showing a simplified view with partial omission.
Figure 1:
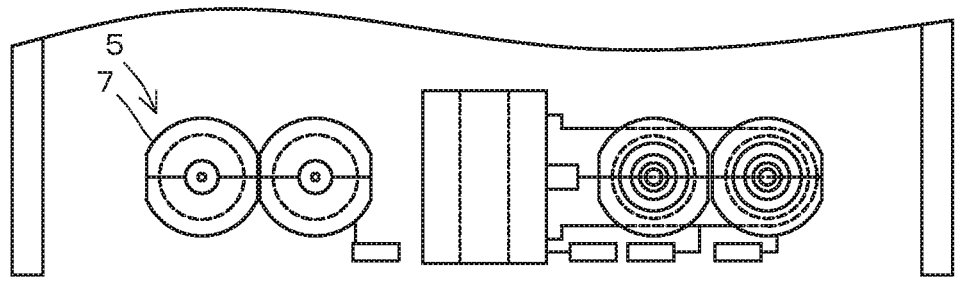
Figure 2:
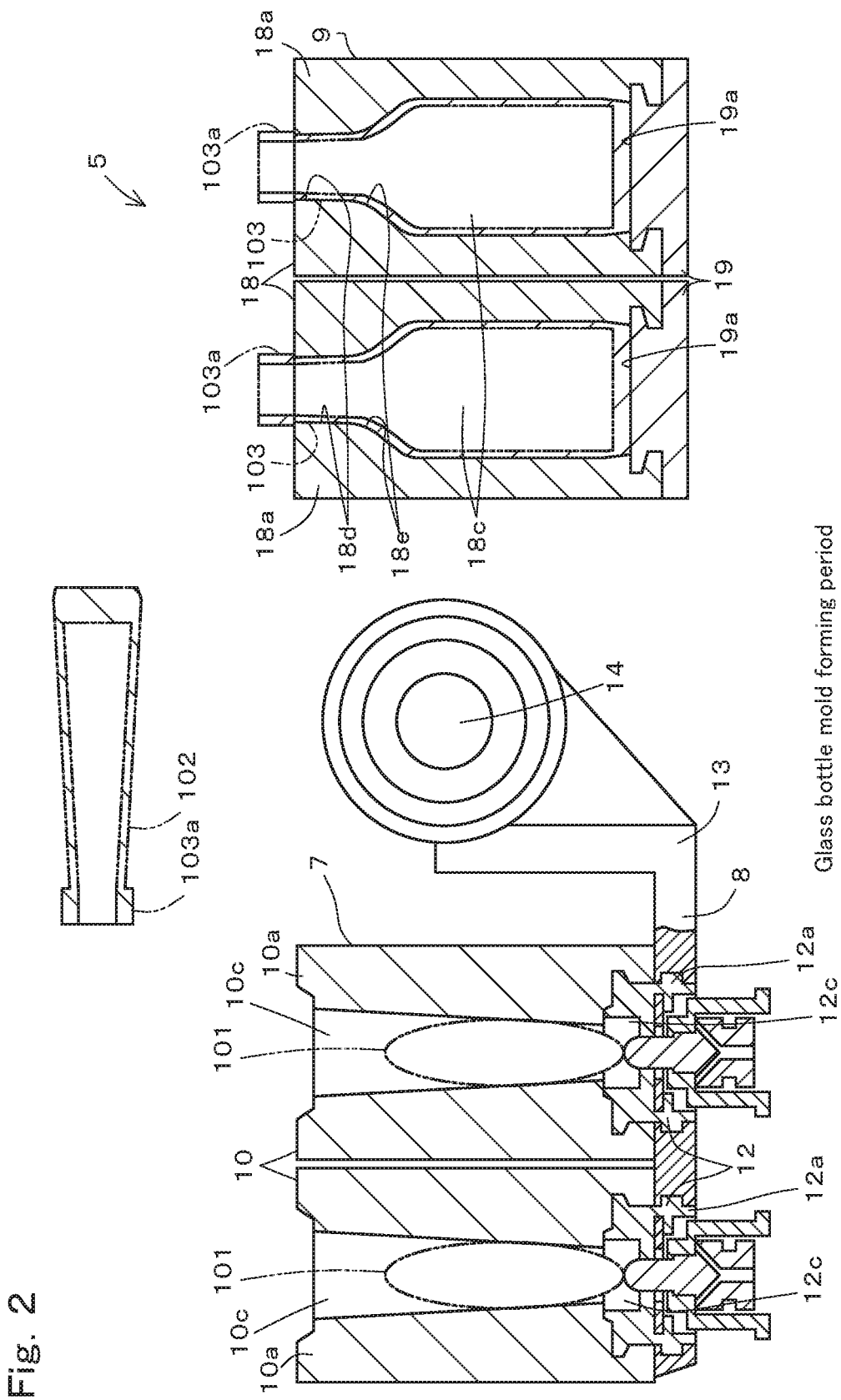
FIG. 2 is a schematic side view of the glass bottle manufacturing equipment used to manufacture glass bottles showing a partial cross-section view with partial omission.
Figure 3:
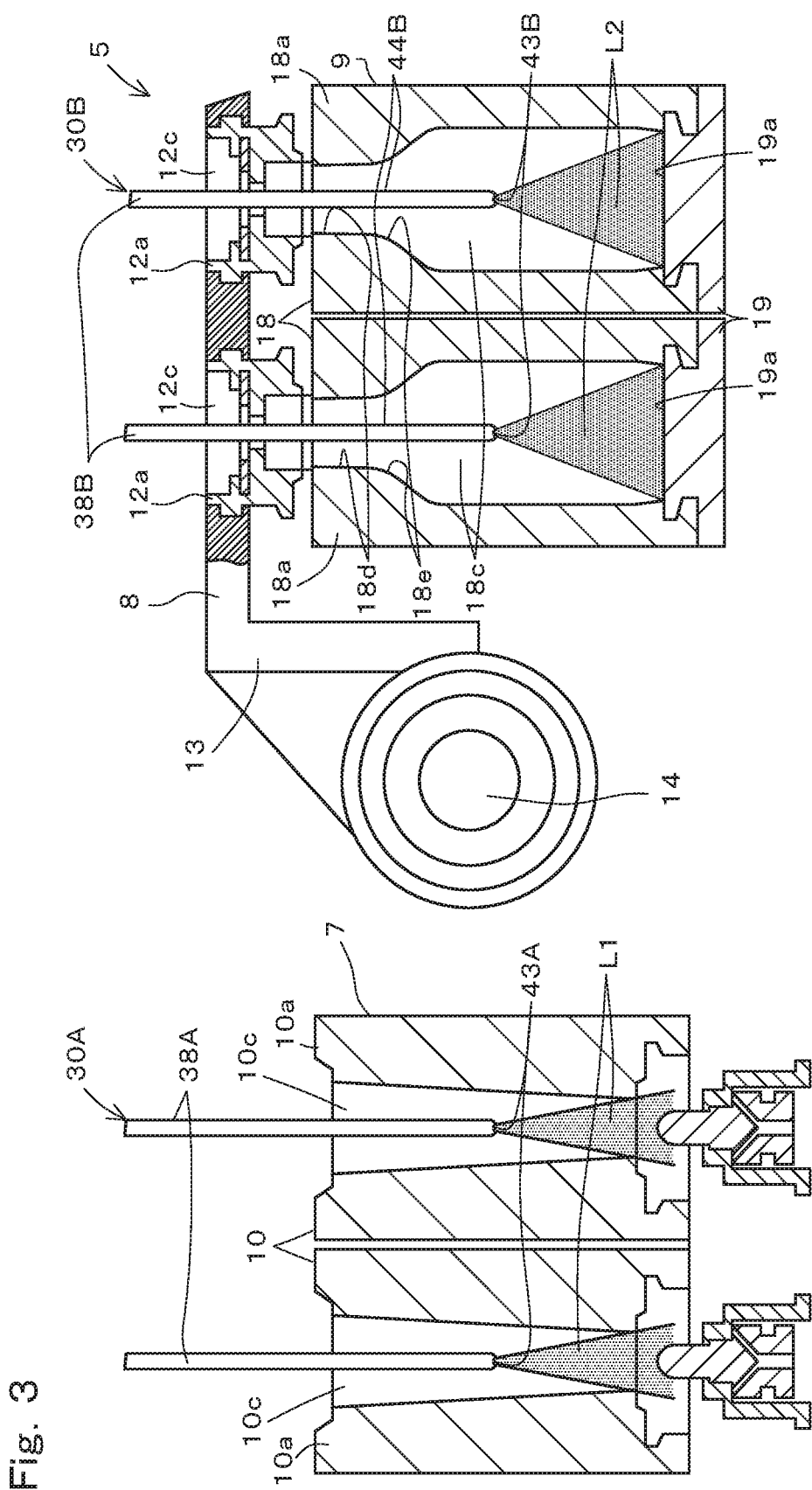
FIG. 3 is a schematic side view exemplifying a part of the glass bottle manufacturing equipment with the mold release lubricant sprayed, and shows a partial cross-section view with partial omission.

FIG. 1 is a schematic plain view of glass bottle manufacturing equipment 1 according to one embodiment of the present invention showing a simplified view with partial omission. FIG. 2 is a schematic side view of the glass bottle manufacturing equipment 1 while manufacturing glass bottles 103, with partial omission. FIG. 3 is a schematic side view exemplifying a part of the glass bottle manufacturing equipment 1 with the mold release lubricant sprayed, with a partial cross-sectional view and partial omission.

Figure 4:
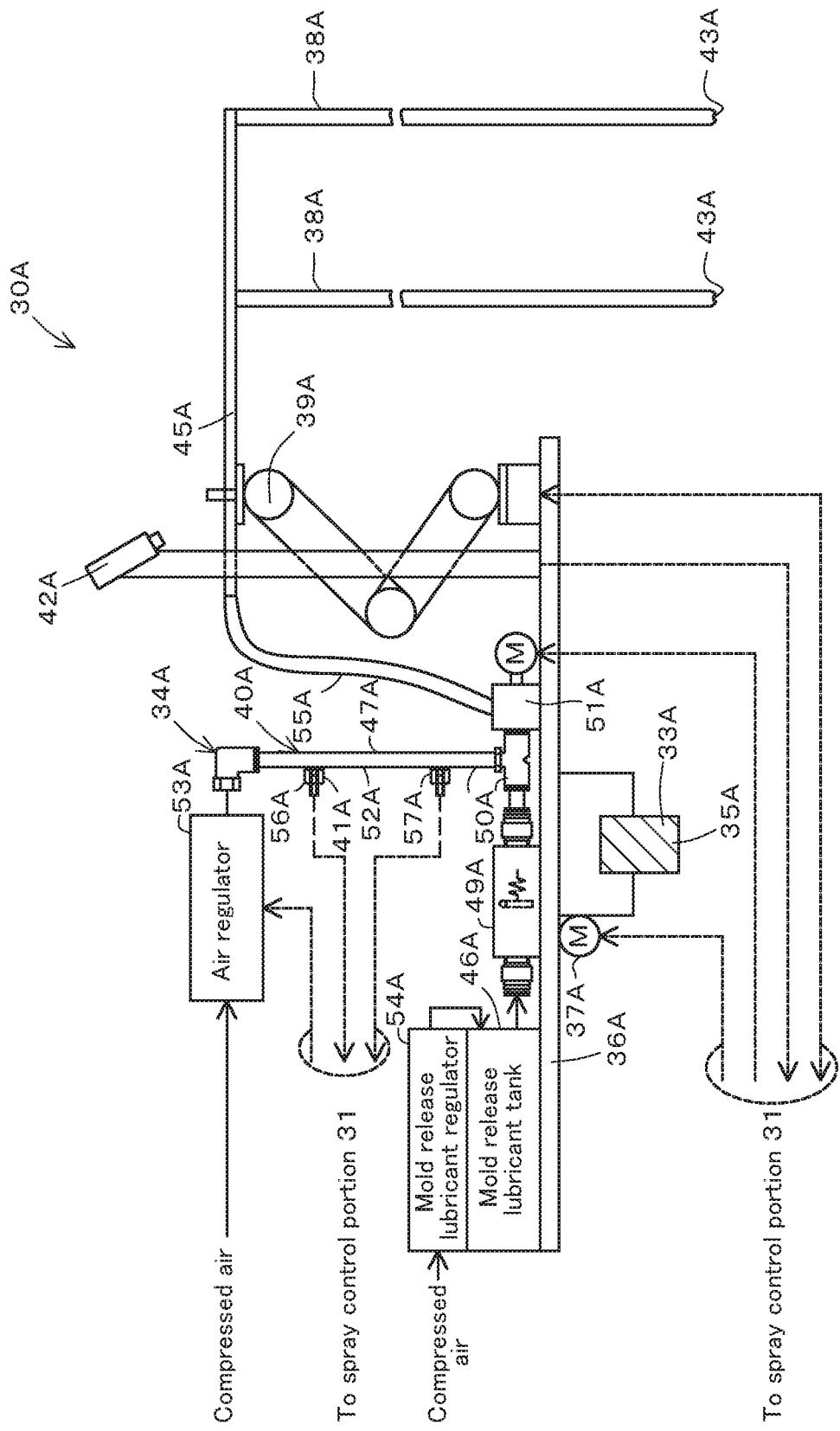
FIG. 4 is a schematic side view of the first spray portion in a mold release lubricant spraying equipment of the glass bottle manufacturing equipment.
Figure 5:
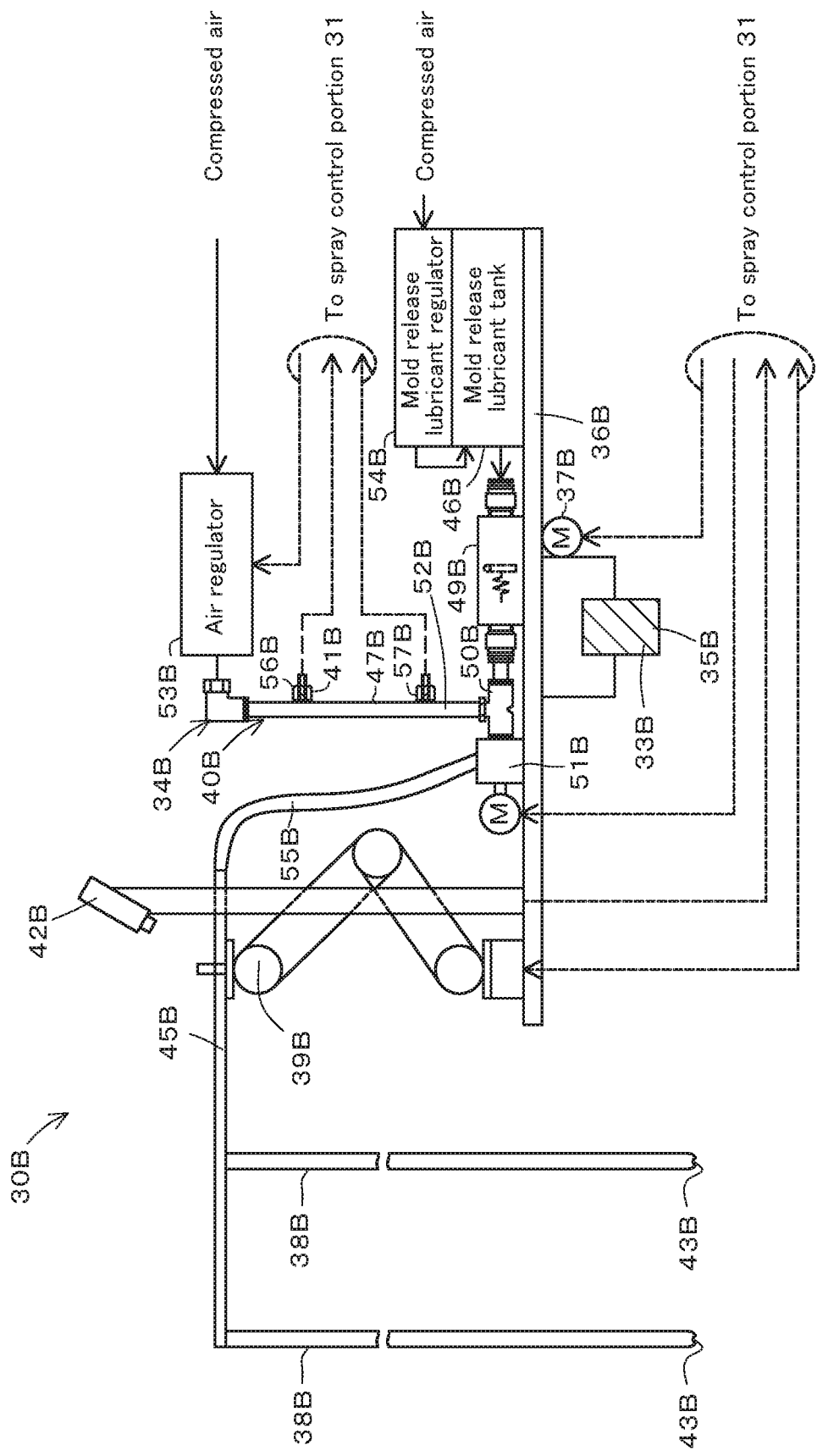
FIG. 5 is a schematic side view of the second spray portion in the mold release lubricant spraying equipment of the glass bottle manufacturing equipment.
Figure 6:
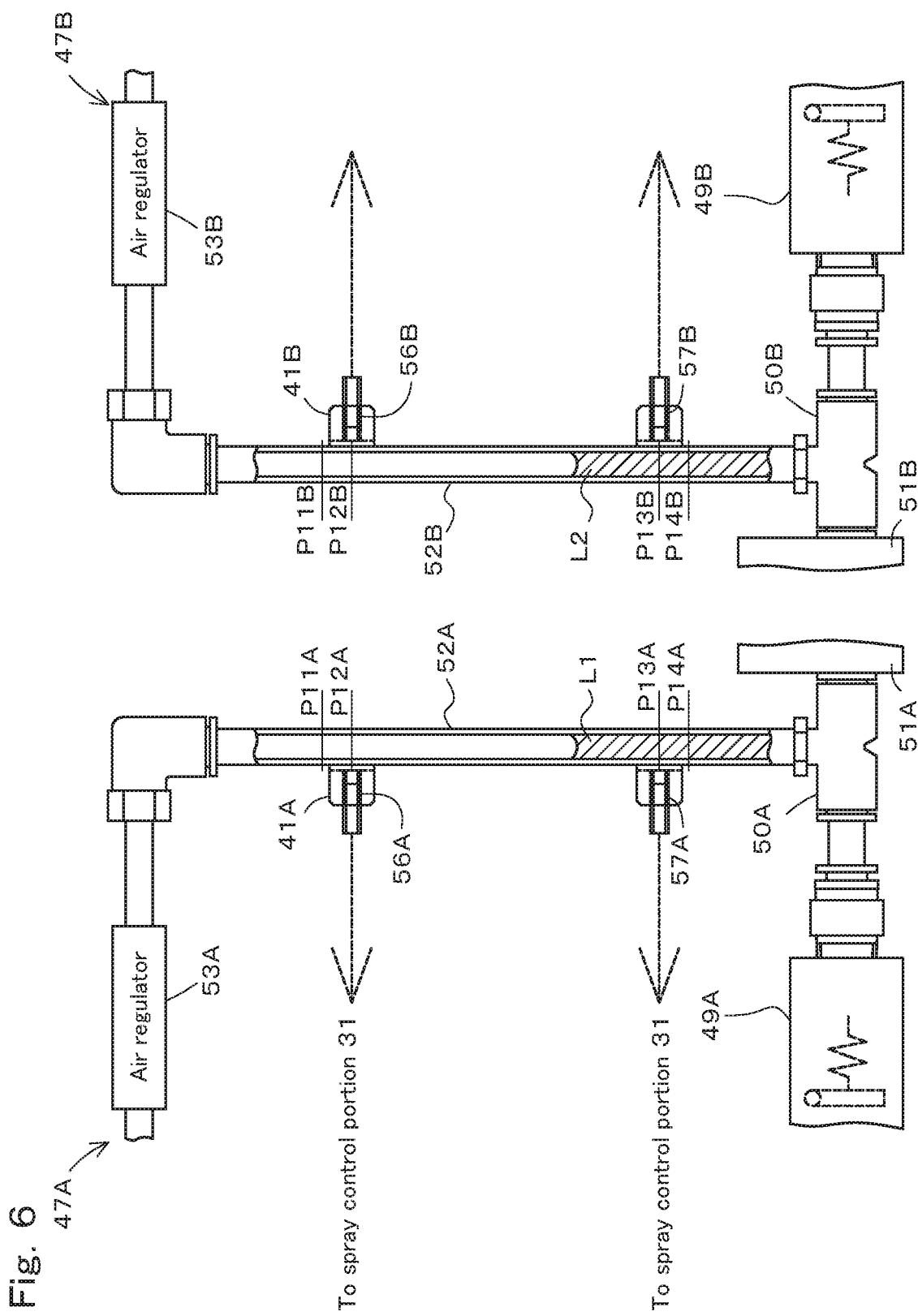
FIG. 6 is a schematic side view of part of a mold release lubricant pump of the first spray portion and the mold release lubricant pump of the second spray portion showing a partial cross-section view.

FIG. 4 is a schematic side view of the first spray portion 30A of a mold release lubricant spraying equipment 4 of the glass bottle manufacturing equipment 1. FIG. 5 is a schematic side view of the second spray portion 30B of the mold release lubricant spraying equipment 4 of the glass bottle manufacturing equipment 1. FIG. 6 is a schematic side view of a mold release lubricant pump 47A of the first spray portion 30A and of a mold release lubricant pump 47B of the second spray portion 30B, with partial cross-sectional view.

Referring to FIGS. 1 to 3, the glass bottle manufacturing equipment 1 (hereinafter, simply referred to as manufacturing equipment 1) uses a blank mold portion 7 to form gob 101 (a lump of molten glass) supplied by a gob supply mechanism (not shown) into a parison 102. Furthermore, a blow mold portion 9 is used to form the parison 102 into the glass bottle 103. As shown in this embodiment, the glass bottle 103 may be formed using the blow and blow process, or may be formed via the press and blow process. Furthermore, in this embodiment, the manufacturing equipment 1 can form two gobs 101 simultaneously into the glass bottles 103 via each single section 5. Note that the manufacturing equipment 1 is not limited to form two bottles simultaneously in a single section 5. The embodiment may comprise a structure that can simultaneously form glass bottles 103 from one or three or more gobs 101.

The manufacturing equipment 1 comprises a gob supply mechanism (not shown), a glass bottle manufacturing portion 3, the mold release lubricant spraying equipment 4 to serve as the mold release lubricant application equipment, and a glass bottle manufacturing control portion 6 to control the glass bottle manufacturing portion 3.

A plurality of sections 5 are formed in the glass bottle manufacturing portion 3.

For example, 8-12 sections 5 are provided to the glass bottle manufacturing portion 3, which are arranged at substantially even intervals along a predetermined arrangement direction A1.

Each section 5 comprises the blank mold portion 7, a neck ring portion 8, and the blow mold portion 9.

The blank mold portion 7 works in correlation with the neck ring portion 8 to form the gob 101 supplied from the gob supply mechanism to form the parison 102.

The blank mold portion 7 comprises two blank molds 10 for glass bottle forming, and blank mold open/close mechanism 11.

Each blank mold 10 comprises a pair of split molds 10a and 10b that are positioned across from each other. The pair of split molds 10a and 10b which is combined together to form a cavity 10c in which the gob 101 is formed into a parison 102. The opening and closing operation of the pair of split molds 10a and 10b of each blank mold 10 is controlled by the blank mold open/close mechanism 11. Mold release lubricant L1 is regularly applied to the inner surface of the cavity 10c via the first spray portion 30A of the mold release lubricant spraying equipment 4. The mold release lubricant L1 is used to maintain slipperiness between the gob 101 and the blank mold inner surface as well as the releasability of the parison 102 from the blank mold 10.

When the gob 101 is formed into the parison 102, a neck ring 12 of the neck ring portion 8 is positioned below the blank mold 10. The neck ring portion 8 is provided to form a finish area 103a from the gob 101. Furthermore, the neck ring portion 8 is structured so as to transfer the parison 102 formed via the blank mold 10 to the blow mold portion 9.

The neck ring portion 8 comprises two neck rings 12, a neck ring holder 13 to support the neck rings 12, a rotary shaft 14 to which the neck ring holder 13 is attached, and a neck ring open/close mechanism 15.

Each neck ring 12 comprises a pair of half cylindrical shaped split molds 12a and 12b that face each other. Combining these split molds 12a and 12b forms the cylindrical shaped neck ring 12. Via a movement of the neck ring open/close mechanism 15, split molds 12a and 12b are appropriately switched between open state that the split molds are separated, and closed state that the split molds are closed together. When forming the gob 101 into the parison 102, a part of the neck ring 12 fits a bottom of the blank mold 10.

In this embodiment, the neck ring holder 13 is an L-shaped arm member. A mounting position of the neck ring holder 13 is attached to the rotary shaft 14 that extends horizontally. Using rotary mechanism 16, the neck ring holder 13 and the neck rings 12 are able to rotate around the central axis of the rotary shaft 14. With this rotation, neck rings 12 travel between a position at the bottom of the blank mold 10 (position in FIG. 1) and a position at the top of the blow mold portion 9 (position in FIG. 3).

The blow mold portion 9 comprises two blow molds 18 for forming glass bottles, two bottom molds 19, and a blow mold open/close mechanism 20.

Each blow mold 18 forms the glass bottle 103 by working together with the corresponding bottom mold 19 to form the portion of the parison 102 that does not contain the finish area 103a. Each blow mold 18 comprises a pair of split molds 18a and 18b. The blow mold open/close mechanism 20 opens and closes the pair of 18a and 18b of the blow mold 18. These split molds 18a and 18b are combined to form the blow mold 18.

The inner surface of the blow mold 18 and upper surface of the bottom mold 19 form a cavity 18c in which a part of the parison 102 other than the finish area 103a are inserted. The upper surface of each split mold 18a and 18b of the blow mold 18 is flat surface and structured so as to receive the finish area 103a of the glass bottle 103. The upper area of the inner surface of the cavity 18c of the blow mold 18 includes a neck forming area 18d for forming a neck area of the glass bottle 103. The center area of the inner surface of the cavity 18c of the blow mold portion 9 contains a shoulder forming area 18e for forming a shoulder area of the glass bottle 103. Furthermore, the upper surface of the bottom mold 19 comprises a bottom forming area 19a for forming the bottom of the glass bottle 103. A coating layer is formed, such as coated with carbon, on the inner surface of the blow mold 18 and the upper surface of the bottom mold 19. Furthermore, mold release lubricant L2 is regularly applied to these inner surfaces with the second spray portion 30B of the mold release lubricant spraying equipment 4. The mold release lubricant L2 is applied to ensure ease of releasability of the glass bottle 103 from the blow mold 18 and the bottom mold 19.

In the aforementioned blow mold 18, the parison 102 is formed into the glass bottle 103 by compressed air for forming being supplied from a blow head (not shown) towards the parison 102, the majority of which is placed in the cavity 18c. From there, the glass bottle 103 is taken out from the blow mold 18 with a takeout arm (not shown), subsequently is transferred by a conveyor (not shown).

A plurality of sections 5 are formed along the arrangement direction A1. Each section 5 includes the blank molds 10, the neck rings 12, and the blow molds 18, which are aligned in the direction perpendicular to the arrangement direction A1 in plain view. Via this structure, a plurality of blank molds 10 are arranged independently along the arrangement direction A1. Furthermore, a plurality of blow molds 18 are arranged independently along the arrangement direction A1.

Figure 7:
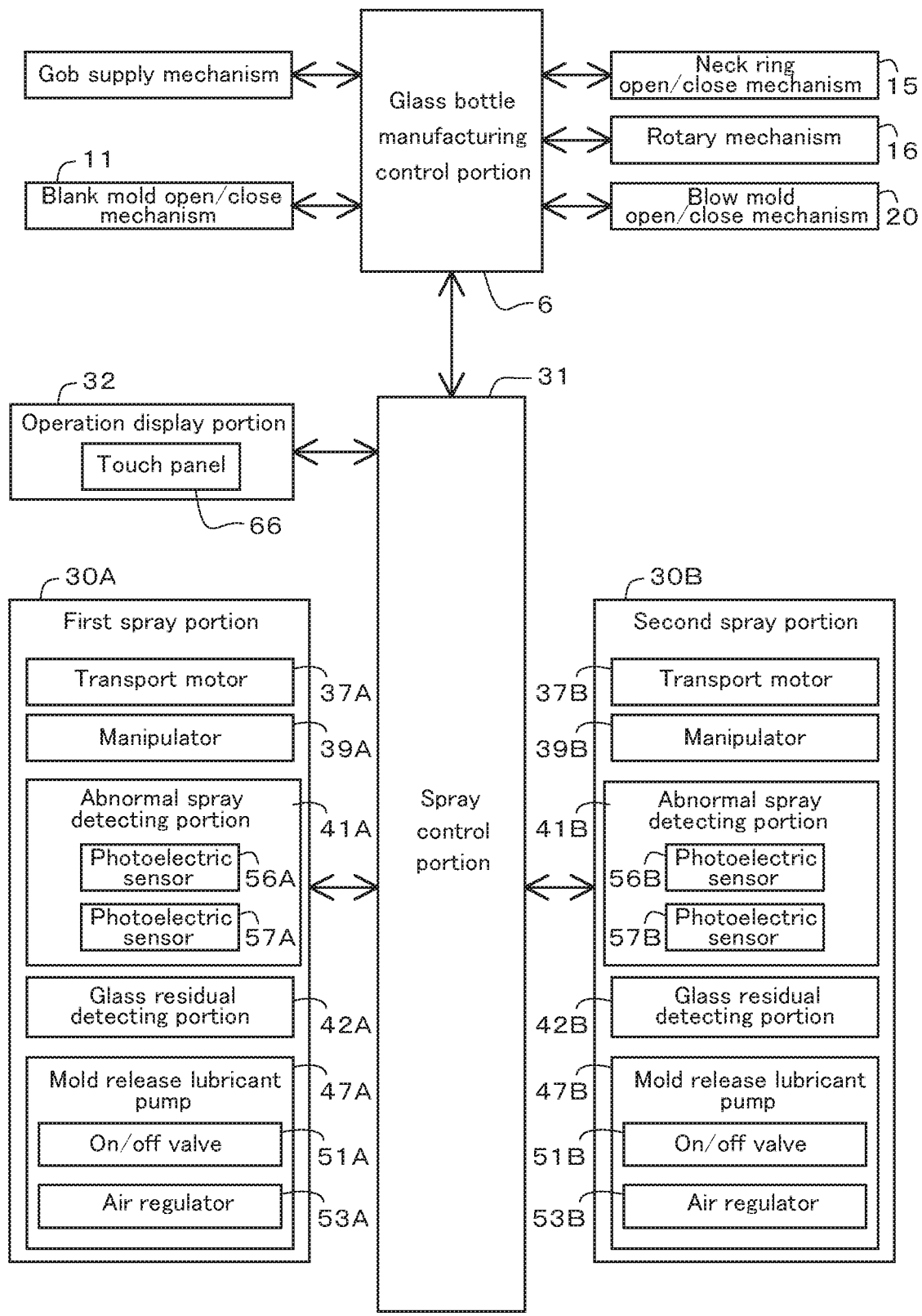
FIG. 7 is a block diagram schematically showing a major part of an electrical structure of the glass bottle manufacturing equipment.

FIG. 7 is a block diagram showing a schematic view of the major part of the electric structure of the manufacturing equipment 1. Referring to FIGS. 1 to 7, the glass bottle manufacturing portion 3 comprising the aforementioned structure is controlled by the glass bottle manufacturing control portion 6. The glass bottle manufacturing control portion 6 comprises a computer containing, for example, a CPU (Central Processing Unit), ROM (Read Only Memory), and RAM (Random Access Memory), and a PLC (Programmable Logic Controller) or a sequence circuit and the like.

The glass bottle manufacturing control portion 6 is electrically connected to the gob supply mechanism, and outputs commands to the gob supply mechanism to supply the gobs 101 from the gob supply mechanism to the blank molds 10 and commands to stop supplying the gobs 101 from the gob supply mechanism to the blank molds 10.

The glass bottle manufacturing control portion 6 is electrically connected to the blank mold open/close mechanism 11, the neck ring open/close mechanism 15, and the blow mold open/close mechanism 20, and controls the open/close operations for these mechanisms 11, 15 and 20.

Furthermore, the glass bottle manufacturing control portion 6 is electrically connected to the rotary mechanism 16 that rotationally drives the rotary shaft 14, and controls the position of the neck rings 12 by controlling the rotary mechanism 16.

The mold release lubricant L1 used to ensure slipperiness and releasability (easiness of removal) between the blank mold 10 and the parison 102, is applied during forming process of the glass bottle 103. The mold release lubricant L2 used to ensure slipperiness and releasability (easiness of removal) between the blow mold 18 and glass bottle 103 is applied during forming process of the glass bottle 103. The mold release lubricant spraying equipment 4 is used to apply these mold release lubricants L1 and L2. Hereinafter, the mold release lubricant spraying equipment 4 is simply referred to as a spraying equipment 4.

The spraying equipment 4 comprises the first spray portion (the first application portion) 30A for applying the mold release lubricant L1 for the blank molds 10, to the inner surfaces of the cavities 10c of the blank molds 10, the second spray portion (the second application portion) 30B for applying the mold release lubricant L2 used for the neck rings 12, the blow molds 18, and the bottom molds 19, to the inner surfaces of cavities 12c of the neck rings 12, the upper surfaces of the blow molds 18, and the inner surfaces of the cavities 18c, a spray control portion (the application control portion) 31 for operating the first spray portion 30A and the second spray portion 30B in association with each other, and an operation display portion 32.

This embodiment is explained using an example of a structure through which the second spray portion 30B applies the mold release lubricant L2 to the inner surfaces of the cavities 12 of the neck rings 12 but this is not a required structure. For example, this embodiment may be structured so that the first spray portion 30A applies the mold release lubricant L1 to the inner surfaces of the cavities 12c of the neck rings 12.

This embodiment is explained using an example of an embodiment through which the mold release lubricant L1 and the mold release lubricant L2 are sprayed via nozzles 38A and nozzles 38B respectively as the lubricant application parts though, this is not a required embodiment. For example, this embodiment may be structured so that the mold release lubricant L1 and the mold release lubricant L2 are applied using the lubricant application parts such as a brush in place of the nozzles 38A and the nozzles 38B.

In this embodiment, the structural parameters of the first spray portion 30A are described with a letter "A" in addition to a numerical code and the structural parameters of the second spray portion 30B are described with a letter "B" in addition to a numerical code. Furthermore, the same numerical code is applied to the structural parameters of the first spray portion 30A and the structural parameters of the second spray portion 30B. When collectively referring to the structural parameters of the first spray portion 30A and the structural parameters of the second spray portion 30B, the codes "A" and "B" may be omitted with only the numerical codes indicated.

In this embodiment, when the arrangement direction A1 is aligned, the first spray portion 30A and the second spray portion 30B are structured as shown in the plain view shown in FIG. 1 (symmetrical to the direction perpendicular to the arrangement direction A1). Furthermore, excluding the point that the first spray portion 30A sprays the mold release lubricant L1 to the blank molds 10, and the second spray portion 30B sprays the mold release lubricant L2 to the blow molds 18, these structures are identical. Thus, the explanation below mostly refers to as the structure of the first spray portion 30A and omits the explanation of the second spray portion 30B.

Referring to FIGS. 1, 3, and 4, the first spray portion 30A is provided on a plurality of sections 5 in relation to the blank mold portion 7. In other words, the single first spray portion 30A sprays the mold release lubricant L1 to all the blank mold portions 7.

As the mold release lubricant L1 applied by the first spray portion 30A, a mineral oil containing graphite particles as a solid lubricant may be exemplified. In this embodiment, the first spray portion 30A is structured so as to apply the mold release lubricant L1 to, at least a part of the upper and lower surfaces inside the cavity 10c of the blank mold 10.

The first spray portion 30A comprises a transport mechanism 33 (the first transport mechanism) A and a spraying unit 34A.

The transport mechanism 33A is provided to move the spraying unit 34A that includes the nozzles 38A for applying the mold release lubricant L1, among a plurality of blank molds 10 along the arrangement direction A1. The transport mechanism 33A is able to position the nozzles 38A of the spraying unit 34A in the side of the blank mold portion 7 in the section 5 where the mold release lubricant L1 is sprayed.

The transport mechanism 33A comprises a rail 35A, which extends along the arrangement direction A1, base parts 36A that move on the rail 35A, and a transport motor 37A that serves as a drive motor for transmitting a driving force to the base parts 36A in the arrangement direction A1. The base parts 36A are provided with the spraying unit 34A.

The spraying unit 34A is structured so as to spray the mold release lubricant L1 on each section 5 by moving along the arrangement direction A1. Furthermore, in this embodiment, the spraying unit 34A has a monitoring function whether or not an abnormality is occurring in the blank mold portion 7. When not working, the spraying unit 34A is positioned at a designated first standby position P1. In this embodiment, the first standby position P1 is further set outside from the one end of plurality of the sections 5 along the arrangement direction A1. At the first standby position P1, the spraying unit 34A does not face any of sections 5 in a direction that is perpendicular to the arrangement direction A1.

The spraying unit 34A comprises the nozzles (the first lubricant application parts) 38A that sprays the mold release lubricant L1, a manipulator 39A for changing the position of the nozzles 38A, a mold release lubricant supply portion 40A for supplying the mold release lubricant L1 to the nozzles 38A, an abnormal spray detecting portion 41A, and a glass residual detecting portion 42A.

The nozzles 38A are used to spray the mold release lubricant L1. In this embodiment, the nozzles 38A are formed in a shape of thin, long rods. Note that the nozzles 38A are does not necessarily to be a thin, long rod shape. The number of nozzles 38A provided is the same as the number of blank molds 10 in a single section 5. In this embodiment, two are provided. Each nozzle 38A is formed to have a length that at least enables the tip of the nozzle 38A to be inserted into the cavity 10c. Each nozzle 38A may spray the blank mold 10 with the mold release lubricant L1 while being raised by the manipulator 39A, or being lowered, or may spray the mold release lubricant L1 after being inserted in the cavity 10c in a stop state. Spray holes 43A are formed on the tip of nozzle 38A. A diameter of the spray holes 43A are structured, for example, to be approximately 1 mm or smaller. The mold release lubricant L1 is sprayed from the spray holes 43A to form, for example, a full cone spray pattern.

The mounting part of the nozzle 38A is fixed onto the hollow shaft shaped manifold 45A. A channel for the mold release lubricant L1 is formed inside the manifold 45A. The mold release lubricant L1 passes through the manifold 45A into the channel of the corresponding nozzle 38A and is sprayed from the corresponding spray holes 43A.

The manipulator 39A is used to change the position of nozzles 38A with respect to the blank molds 10 as well as to maintain the position of the nozzles 38A. The manipulator 39A is formed, for example, using a multiple joint robot with multiple axes. The manipulator 39A, in this embodiment, can cause the nozzles 38A to rotate around each joint, and to shift parallel to direction of X, Y, and Z axes that are mutually orthogonal.

Note that it is acceptable if the manipulator 39A can at least cause the nozzles 38A to enter and exit the cavities 10c of the blank molds 10, thus there are no limitations on a specific structure. The manifold 45A is fixed to the tip of the manipulator 39A. As a result, the manipulator 39A and the manifold 45A can change the position of the nozzles 38A.

The mold release lubricant supply portion 40A is provided to supply the mold release lubricant L1 to the nozzles 38A via the manifold 45A.

The mold release lubricant supply portion 40A comprises a mold release lubricant tank 46A and the mold release lubricant pump 47A.

Compressed air is supplied to a mold release lubricant regulator 54A (to be described later) of the mold release lubricant pump 47A and an air regulator 53A, from an air compressor or other compressed air supply source (not shown) installed at a distance from the mold release lubricant supply portion 40A. The mold release lubricant regulator 54A is connected to the mold release lubricant tank 46A. The mold release lubricant tank 46A is a tank for filling the mold release lubricant L1. The air pressure from a compressed air supply source is applied to the mold release lubricant L1 contained in the mold release lubricant tank 46A.

The mold release lubricant pump 47A is provided to supply the mold release lubricant L1 to the nozzles 38A at a predetermined pressure. In this embodiment, the mold release lubricant pump 47A is a volumetric pump, which is a kind of reciprocating pump. The mold release lubricant pump 47A draws in and discharges the mold release lubricant L1 by using supplied compressed air as a dynamic fluid.

The mold release lubricant pump 47A comprises a check valve 49A, a three-way coupling joint 50A, an on/off valve 51A, a syringe 52A, the air regulator 53A, and the mold release lubricant regulator 54A.

The check valve 49A is connected to the mold release lubricant tank 46A and the three-way coupling joint 50A. The check valve 49A allows movement of the mold release lubricant L1 from the mold release lubricant tank 46A to the three-way coupling joint 50A but prevents reverse flow of the mold release lubricant L1 from the three-way coupling joint 50A to the mold release lubricant tank 46A.

The three-way coupling joint 50A is a pipe connecting the check valve 49A (the mold release lubricant tank 46A), the syringe 52A, and the nozzles 38A (hose 55A).

The on/off valve 51A, for example, is a needle valve and the spray control portion 31, which controls on and off of pilot air supply to the needle valve, controls the on/off operation of the on/off valve 51A. The on/off valve 51A is connected to the manifold 45A via, for example, a flexible hose 55A. The mold release lubricant L1 passing through the on/off valve 51A passes through the hose 55A and the manifold 45A to reach the nozzles 38A and is sprayed from the spray holes 43A of the nozzles 38A.

The syringe 52A alternatively suctions or discharges the mold release lubricant L1 by compressed air. The syringe 52A is a material that is formed into a thin, long cylindrical shape, in which compressed air is introduced via the air regulator 53A, and the mold release lubricant L1 is introduced via the mold release lubricant regulator MA and the mold release lubricant tank 46A. The abnormal spray detecting portion 41A, for example, optically monitors the syringe 52A for a state of the mold release lubricant L1. Thus, in this embodiment, the syringe 52A is made from a material with translucency. With this structure, changes in the amount of the mold release lubricant L1 in the syringe 52A, in other words, changes in discharge of the mold release lubricant L1 from a single mold release lubricant spraying operation by the mold release lubricant pump 47A are monitored.

The upper end of the syringe 52A is connected to the air regulator 53A. The compressed air enters and exits the syringe 52A through the upper end. The lower end of the syringe 52A is connected to the mold release lubricant tank 46A via the three-way coupling joint 50A. The mold release lubricant L1 enters and exits the syringe 52A through this lower end.

Referring to FIGS. 4 and 6, the first upper limit P11A of the mold release lubricant L1 inside the syringe 52A is the highest fluid level (upper surface) when the mold release lubricant L1 is taken into the syringe 52A.

The first lower limit P14A of the mold release lubricant L1 in the syringe 52A is the fluid level at the time of completion of discharge of the mold release lubricant L1 from the syringe 52A to the nozzles 38A. This is the lowest surface level of the mold release lubricant L1 inside the syringe 52A. When the mold release lubricant pump 47A is not experiencing an abnormality, the first lower limit P14A is the level at which the mold release lubricant L1 is constantly present.

The air regulator 53A is provided to adjust the pressure of compressed air supplied into the syringe 52A from the compressed air supply source. The air regulator 53A is an electro pneumatic regulator and is controlled by the spray control portion 31.

More specifically, the spray control portion 31 controls the air regulator 53A to control the supply of compressed air to the syringe 52A and discharge of compressed air from the syringe 52A. Furthermore, the spray control portion 31 controls the on/off operation of the on/off valve 51A. Through this implementation, the spray control portion 31 controls supply of the mold release lubricant L1 from the mold release lubricant pump 47A to the nozzles 38A.

Subsequently, the intake operation of the mold release lubricant L1 with the mold release lubricant pump 47A is described.

When the mold release lubricant L1 is taken into the syringe 52A of the mold release lubricant pump 47A, the spray control portion 31 closes the on/off valve 51A and controls the air regulator 53A to keep the air pressure inside the syringe 52A lower than the liquid pressure of the mold release lubricant inside the syringe 52A. As a result, the mold release lubricant L1 passes through the check valve 49A and the three-way coupling joint 50A to flow into the syringe 52A. After the mold release lubricant L1 reaches the first upper limit P11A, the spray control portion 31 controls the air regulator 53A to keep the air pressure inside the syringe 52A higher than the liquid pressure inside the syringe 52A. As a result, the check valve 49A closes to stop the flow of the mold release lubricant L1 to the syringe 52A.

Subsequently, the discharge operation (spraying) of the mold release lubricant L1 with the mold release lubricant pump 47A is described.

When spraying the mold release lubricant L1, the spray control portion 31 opens the on/off valve 51A. As a result, compressed air, whose pressure is adjusted by the air regulator 53A, pushes out the mold release lubricant L1 in the syringe 52A to be sprayed through the spray holes 43A. After spraying for a predetermined time period, the spray control portion 31 closes the on/off valve 51A. This completes the spraying of the mold release lubricant L1 from the mold release lubricant pump 47A.

The mold release lubricant pump 47A conducts the mold release lubricant L1 spraying operation as a single cycle of the abovementioned intake operation and discharge operation of the mold release lubricant.

The abnormal spray detecting portion 41A is provided to detect any abnormality in the first spray portion 30A.

The abnormal spray detecting portion 41A is structured so as to detect the mold release lubricant L1 to check for any abnormality in spraying the mold release lubricant L1 in the first spray portion 30A.

The abnormal spray detecting portion 41A comprises first photoelectric sensors 56A and 57A that detect light. Each first photoelectric sensor 56A and 57A is fixed to the outer circumference of the syringe 52A. Each first photoelectric sensor 56A and 57A comprises a lighting portion and a detecting portion. Furthermore, each photoelectric sensor 56A and 57A outputs a detection signal that is based on the strength of the light detected by the detecting portion, to the spray control portion 31. It is acceptable if each photoelectric sensor 56A and 57A outputs a signal based on the strength of the light detected by the detecting portion as a detected signal, and this implementation is not limited to any specific principle.

The first photoelectric sensor 56A is positioned near the first upper limit P11A and near the first upper detecting position P12A below the first upper limit P11A, and outputs different detection signals depending on when the mold release lubricant L1 is present at the first upper detecting position P12A, or not. The first photoelectric sensor 57A is positioned near the first lower limit P14A and near the first lower detecting position P13A above the first lower limit P14A, and outputs different detection signals depending on when the mold release lubricant L1 is present at the first lower detecting position P13A, or not.

In this way, the first upper detecting position P12A and the first lower detecting position P13A are arranged between the first upper limit P11A and the first lower limit P14A in the longitudinal direction of the syringe 52A. This is a measure against a concave meniscus to be formed on the mold release lubricant L1 liquid surface level via an interaction between the mold release lubricant L1 and the syringe 52A. This arrangement eliminates the impact of the meniscus caused by the interaction between the mold release lubricant L1 and the syringe 52A. The first photoelectric sensors 56A and 57A operate the non-contact detection of the mold release lubricant L1 through the syringe 52A that is comprised of a light-transmitting portion.

Note that in this embodiment, despite of the description of the structure for detecting the mold release lubricant L1 using the first photoelectric sensors 56A and 57A, this is not a requirement. A sensor with a structure for outputting a detection signal depending on the existence of the mold release lubricant L1, for example, a magnetic sensor or a heat sensitive sensor, may be used in place of the first photoelectric sensors 56A and 57A.

An exemplification of an abnormality that could occur in the spraying unit 34A is the sprayed amount of the mold release lubricant L1 from the spray holes 43A of the nozzle 38A, which diverges from a design value. The abnormality can be exemplified as (1) malfunctions in the compressed air supply source or the on/off valve 51A, the regulators 53A and 54A, or the check valve 49A, spray pressure changes due to cracks in release lubricant L1 piping or compressed air piping, (2) changes in spray time due to the on/off valve 51A operating errors, (3) changes in mold release lubricant temperature (viscosity) due to air temperature change, and (4) changes of the spray area of the mold release lubricant L1 due to clogs in the spray holes 43A of the nozzle 38A.

Furthermore, abnormalities occurring in the first spray portion 30A are detected by the abnormal spray detecting portion 41A. Specifically, if an abnormality in mold release lubricant discharge occurs to the syringe 52 of the mold release lubricant pump 47A, after the mold release lubricant L1 discharge operation starts by the mold release lubricant pump 47A, it is perceivable that the first mold release lubricant L1 liquid surface does not reach the first lower detecting position P13A within a predetermined time. Furthermore, in the event of an abnormality of intake of the mold release lubricant occurs to the syringe 52A of the mold release lubricant pump 47A, after the start of the mold release lubricant L1 intake operation by the mold release lubricant pump 47A, it is perceivable that the first mold release lubricant L1 liquid surface does not reach the first upper detecting position P12A within the predetermined time. Furthermore, after the intake operation, it is perceivable that the mold release lubricant L1 liquid surface is to fall below the first upper detecting position P12A before the on/off valve MA opens (prior to discharge start). As a result, in this embodiment, the spray control portion 31 detects these types of abnormalities based on the presence of the mold release lubricant L1 detected by the first photoelectric sensors 56A and 57A.

The spraying unit 34A has a structure for detecting the spray abnormality of the mold release lubricant described above as well as a structure for detecting abnormal residual glass lumps occurring to the blank mold 10. Specifically, the spraying unit 34A comprises the glass residual detecting portion 42A.

Referring to FIGS. 1, 2, and 4, the glass residual detecting portion 42A is provided to detect whether or not a gob 101 or parison 102 remains in the form of a lump of glass inside the cavity 10c of each blank mold 10. The glass residual detecting portion 42A is one example of "a sensor" in this invention. The glass residual detecting portion 42A is, for example, formed using a CCD camera (Charge Couple Device Camera) or other solid body imaging element for photographing the cavity 10c, and photographs the inner surface of each cavity 10c in the section 5 at which the spraying unit 34A is arranged. Note that it is acceptable as long as the glass residual detecting portion 42A detects a lump of glass in a molten state or at a high temperature close to a molten state, the sensor may be an infrared detection device and the like.

Subsequently, referring to FIGS. 1 to 6, a structure of the second spray portion 30B is described. Note that, as described previously, the structure of the second spray portion 30B is the same as the first spray portion 30A, thus the explanation of the second spray portion 30B has been simplified.

As the mold release lubricant L2 applied by the second spray portion 30B, a mineral oil containing graphite particles as a solid lubricant may be exemplified. In this embodiment, the second spray portion 30B is structured so as to apply the mold release lubricant L2 to, at least a part of the upper and lower surfaces inside the cavity 18c of the blow mold 18, and inside the cavity 12c of the neck ring 12.

The second spray portion 30B comprises a transport mechanism 33B and a spraying unit 34B.

The transport mechanism 33B is provided to move the spraying unit 34B, which includes the nozzles 38B for applying the mold release lubricant L2, among the plurality of blow molds 18 along the arrangement direction A1. The transport mechanism 33B is able to arrange the nozzles 38B of the spraying unit 34B in the side of the blow mold portion 9 in the section 5 where the mold release lubricant L2 is sprayed.

Each nozzle 38B is formed to have a length that at least enables the tip of the nozzle 38B to be inserted into the cavity 18c. When the nozzle 38B sprays at least one of the neck ring 12, the blow mold 18, and the bottom mold 19 with the mold release lubricant L2, as shown in FIG. 3, the mold release lubricant L2 from spray holes 43B of the nozzle 38B is sprayed on the corresponding neck ring 12, blow mold 18, and bottom mold 19. Note that, in this embodiment, the spraying of the mold release lubricant L2 on at least one of the neck ring 12, blow mold 18, and the bottom mold 19, may be collectively referred to as "spraying the mold release lubricant L2 on the blow mold 18".

Note that it is acceptable if a manipulator 39B can at least causes the nozzle 38B to enter and exit the cavity 12c of the neck ring 12 and the cavity 18c of the blow mold 18, and there are no limitations on a specific structure.

A glass residual detecting portion 42B is provided to detect whether or not a parison 102 or a glass bottle 103 remains in the cavity 18c of the blow mold 18 as a lump of glass. The glass residual detecting portion 42B is one example of "a sensor" in this invention. The glass residual detecting portion 42B is formed from, for example, a CCD camera or other solid body imaging element for photographing the cavity 18c, and photographs the inner surface of each cavity 18c in the section 5 where the spraying unit 34B is arranged.

The above is an outline of the description of the second spray portion 30B.

Subsequently, the configuration of the spray control portion 31 is described.

Referring to FIGS. 1, 4, 5, and 7, the spray control portion 31 comprises a configuration for outputting a specific output signal based on a specific input signal and may be configured, for example, via a programmable controller (PLC). Note that the spray control portion 31 may also be configured using a computer comprising a central processing unit (CPU), random access memory (RAM), and read only memory (ROM), and may be configured using a Field Programmable Gate Array (FPGA) or other programmable logic device. The spray control portion 31 is arranged, for example, on the side of the first section 5 of the glass manufacturing portion 3, and is electrically connected to each portion wirelessly or via an electric wire (not shown) to the first spray portion 30A and the second spray portion 30B.

In this embodiment, the spray control portion 31 is connected to the glass bottle manufacturing control portion 6, the first spray portion 30A, the second spray portion 30B, and the operation display portion 32, and is able to communicate with these portions 6, 30A, 30B, and 32.

In this embodiment, the glass bottle manufacturing control portion 6 outputs a signal to the spray control portion 31 at specific intervals. The Spray control portion 31 uses this signal to determine whether or not section 5 is working or stopped, and to adjust the timing of the application operation.

The connection relationship between the spray control portion 31 and the first spray portion 30A is to be described. The spray control portion 31 is connected to the transport motor 37A of the first spray portion 30A, the manipulator 39A, the abnormal spray detecting portion 41A (the first photoelectric sensors 56A and 57A), the glass residual detecting portion 42A, and the mold release lubricant pump 47A (the on/off valve 51A, the air regulator 53A).

The connection relationship between the spray control portion 31 and the second spray portion 30B is to be described more specifically, the spray control portion 31 is connected to a transport motor 37B of the second spray portion 30B, the manipulator 39B, an abnormal spray detecting portion 41B (the photoelectric sensors 56B and 57B), the glass residual detecting portion 42B, and the mold release lubricant pump 47B (the on/off valve 51B, air regulator 53B).

The spray control portion 31 is configured so as to control the positioning of the spraying unit 34A in the arrangement direction A1 by the transport mechanism 33A (cyclic moving operation of the nozzles 38A to each section 5), the positioning of the nozzles 38A by the manipulator 39A, and the supply of the mold release lubricant L1 from the mold release lubricant pump 47A to the nozzles 38A (nozzles 38A spraying operation).

Similar to the above, the spray control portion 31 is configured so as to control the positioning of the spraying unit 34B in the arrangement direction A1 by the transport mechanism 33B (cyclic moving operation of the nozzles 38B to each section 5), the positioning of the nozzles 38B by the manipulator 39B, and the supply of the mold release lubricant L2 from the mold release lubricant pump 47B to the nozzles 38B (nozzles 38B spraying operation).

The spray control of the mold release lubricants L1 and L2 from the nozzles 38A and 38B to the corresponding blank molds 10 and blow molds 18 (the neck rings 12 and the bottom molds 19) can be conducted by controlling the spray amount from the nozzles 38A and 38B, by controlling the speed of rising and descending the nozzles 38A and 38B with the spray amount fixed, and by controlling the spray timing of the mold release lubricants L1 and L2 from the nozzles 38A and 38B. The desired application can also be achieved by controlling the ON/OFF setting of the mold release lubricants L1 and L2 from the nozzles 38A and 38B.

The spray control portion 31 controls the transport mechanisms 33A and 33B, the manipulators 39A and 39B, the mold release lubricant pumps 47A and 47B, as well as monitors a spray abnormality of the mold release lubricants L1 and L2 via the abnormal spray detecting portions 41A and 41B. Specifically, the spray control portion 31 outputs a specific command signal to the transport motors 37A and 37B of the transport mechanisms 33A and 33B to drive the transport motors 37A and 37B to arrange the spraying units 34A and 34B, which includes the nozzles 38A and 38B, at designated positions along the arrangement direction A1 accordingly. Furthermore, the spray control portion 31 outputs a specific command signal to joint motors of the manipulators 39A and 39B to drive the articulated joint of the corresponding articulation motors. As a result, the spray control portion 31 changes the position of the nozzles 38A and 38B along with the tips of the manipulators 39A and 39B. Furthermore, the spray control portion 31 controls the on/off operation of the on/off valves 51A and 51B, and the air pressure inside the syringes 52A and 52B. The spray control portion 31 cooperatively controls the mold release lubricant pumps 47A and 47B and the corresponding manipulators 39A and 39B. This control enables the nozzles 38A and 38B to be moved in the vertical direction with respect to the corresponding blank molds 10 and blow molds 18, while also spraying the mold release lubricants L1 and L2 from the nozzles 38A and 38B to corresponding locations on the blank molds 10, the blow molds 18, the bottom molds 19, and the neck molds 12. The application range of the mold release lubricants L1 and L2 in the vertical direction may be set arbitrarily. The spray control portion 31 controls the position of the nozzles 38A and 38B by the manipulators 39A and 39B, and controls the mold release lubricant pumps 47A and 47B. This control enables the coating thickness of the mold release lubricants L1 and L2 applied to each portion in the vertical direction to be even or variable.

The spray control portion 31 notifies an abnormality alarm when an abnormality occurs to either of the nozzle 38A or 38B.

The spray control portion 31 is further configured so as to monitor abnormalities of each blank mold 10 and each blow mold 18. When the spray control portion 31 detects that an abnormality occurs to, at least either of the blank mold 10 or the blow mold 18, an abnormality alarm signal is output to the glass bottle manufacturing control portion 6, indicating that an abnormality is detected at the section 5. In this embodiment, receiving the abnormality alarm signal from the spray control portion 31, the glass bottle manufacturing control portion 6 stops glass manufacturing operation in the section 5 to which the abnormality is reported.

The first spray portion 30A and the second spray portion 30B comprising the above structure is controlled by the spray control portion 31 based on command signals output from the operation display portion 32.

The operation display portion 32 is installed on a chassis of the spray control portion 31. The operation display portion 32 includes a touch panel 66.

The touch panel 66 displays a screen for the operator to conduct touch-based operations. The touch panel 66 display content is configured so as to be changed based on commands received from the spray control portion 31 and commands received from an operator. The operation display portion 32 displays an operating button on the touch panel 66 for the operator to input controls. Pressing the specific operating buttons displayed on the touch panel 66 sends specific commands to the spray control portion 31. The touch panel 66 is configured so as to display specific indication other than the operating buttons.

Next is an explanation of the content displayed on the touch panel 66.

The touch panel 66 includes a structure for conducting the following settings (interface screen and signal processing). Specifically, the following settings are included.

(1) Settings for displaying which section 5 is operating within the glass bottle manufacturing portion 3.
(2) Settings for the dimensions of the blank mold 10 and the blow mold 18 (the neck mold 12), the application range for the blank mold 10 and the blow mold 18, the movement speed settings for nozzles 38A and 38B, and the spray pressure for 38A and 38B.
(3) Settings for an application location and time for a regular cycle and a temporary lubricant application mode (these settings may be discretionary, and are not required settings).

(4) Setting whether or not to implement the monitoring mode.
(5) Setting whether or not to implement the regular cycle application mode or the temporary application mode.

Regarding the abovementioned (1) and (2), for example, related buttons are displayed on the touch panel 66. An operator manipulates the button of the relevant operation. As a result, the spray control portion 31 recognizes which section 5 conducts glass bottle manufacturing. Furthermore, the spray control portion 31 puts the settings of the dimensions for the blank mold 10 and the blow mold 18, the application range for the blank mold 10 and the blow mold 18, and the movement speed settings for nozzles 38A and 38B, and the spray pressure for 38A and 38B, to the input values.

Regarding the abovementioned (3), for example, related buttons are displayed on the touch panel 66. The operator manipulates the button of the relevant operation. As a result, the spray control portion 31 recognizes which section 5 is a subject of the mold release lubricants L1 and L2 spraying. Furthermore, referring to FIG. 8 that shows the regular cycle lubricant application setting screen 82 as well as FIGS. 1 and 3, the touch panel 66 displays a regular cycle lubricant application setting screen 82. The regular cycle lubricant application setting screen 82 includes lubricant application cycle time setting buttons 86 and spray location setting buttons 87.

Lubricant application cycle time setting buttons 86 are buttons for setting the interval for starting to spray the mold release lubricants L1 and L2 for the single or multiple sections 5 specified on touch panel 66. When an operator presses any kinds of the lubricant application cycle time setting buttons 86, the spray control portion 31 sets the time corresponding to the pressed button as the time for a single cycle.

The spray location setting buttons 87 are provided to specify the spray location of the mold release lubricant L1 and L2. The spray location setting buttons 87 include a blank mold setting panel button 88, a neck ring setting panel 89, and blow mold setting panel buttons 90.

A blank mold setting panel button 88 is the button for generating the command for the first spray portion 30A to spray the mold release lubricant L1 to the inner surface of the cavity 10c of the blank mold 10. When an operator presses the blank mold setting panel button 88, the spray control portion 31 controls the first spray portion 30A so that it sprays the mold release lubricant L1 to the inner surface of the blank mold 10.

A neck ring setting panel button 89 is a button for generating the command for the first spray portion 30A to spray the mold release lubricant L1 to the inner surface of the cavity 12c of the neck ring 12. When an operator presses the neck ring setting panel button 89, the spray control portion 31 controls the spray portion 30B so that it sprays the mold release lubricant L2 to the neck ring 12. Note that a command may be generated for the first spray portion 30A to spray the mold release lubricant L1 to the inner surface of the cavity 12c of the neck ring 12, by pressing the neck ring setting panel button 89.

The blow mold setting panel buttons 90 are buttons for generating the command for the spray portion 30B to spray the mold release lubricant L2 to the inner surface of the cavity 18c of the blow mold portion 9. The blow mold setting panel buttons 90 include a blow mold upper surface setting panel button 90a, a neck area setting panel button 90b, and a shoulder/bottom area setting panel button 90c.

The blow mold upper surface setting panel button 90a is a button for generating the command to spray the mold release lubricant L2 to the upper surface of the blow mold 18. When an operator presses the blow mold upper surface setting panel button 90a, the spray control portion 31 controls the second spray portion 30B so that it sprays the mold release lubricant L2 to the upper surface of the blow mold 18.

The neck area setting panel button 90b is a button for generating the command to spray the mold release lubricant L2 to the neck forming area 18d of the blow mold 18. When the operator presses the neck area setting panel button 90b, the spray control portion 31 controls the second spray portion 30B so that it sprays the mold release lubricant L2 to the neck forming area 18d of the blow mold 18.

The shoulder/bottom area setting panel button 90c is a button for generating the command to spray the mold release lubricant L2 to the shoulder forming area 18e of the blow mold 18, and the upper surface of the bottom mold 19 (the bottom forming area 19a). When an operator presses the shoulder/bottom area setting panel button 90c, the spray control portion 31 controls the second spray portion 30B so that it sprays the mold release lubricant L2 to the shoulder forming area 18e of the blow mold 18 and the upper surface of the bottom mold 19. Note that the abovementioned structure is one example and depending on programming of the spray control portion 31, the settings may be more detailed.

As described above, the settings set via the regular cycle lubricant application setting screen 82 are settings for the mold release lubricant spraying operations conducted repeatedly on all operating sections regularly by the spray portions 30.

Figure 8:
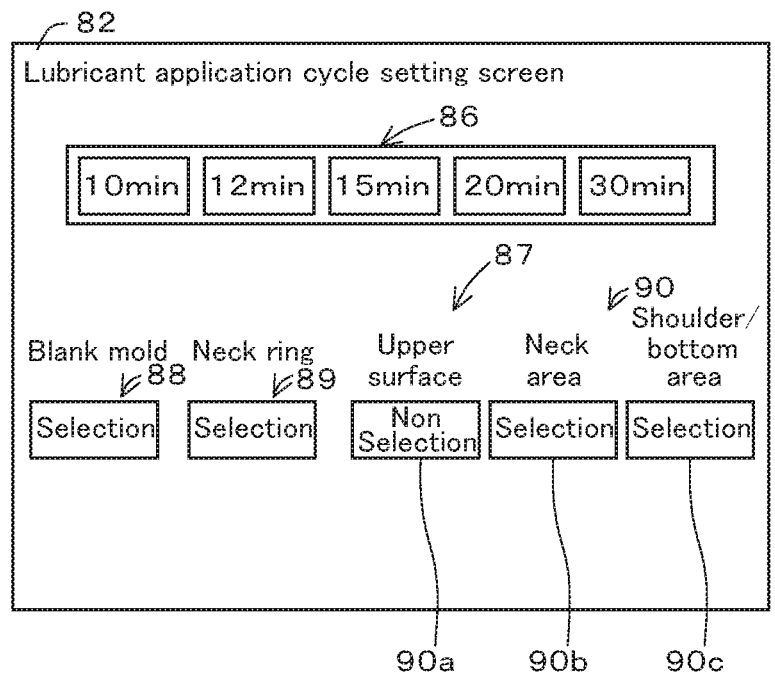
FIG. 8 illustrates a regular cycle lubricant application setting screen.

The above refers to FIG. 8 while explaining spray location settings for the regular cycle lubricant application operation. Furthermore, the spray location settings for the temporary lubricant application operation that is the mold release lubricant spraying operation conducted temporarily (one-time) by the spray portions 30, are input in the same way as spray location settings for the regular cycle lubricant application. Operations conducted in the temporary lubricant application process allow the selection of the application location for each section and only operates application on the selected section. Basic operations are the same as the regular cycle lubricant application. Thus, the explanation of settings for the temporary lubricant application operation is omitted.

Regarding the above setting in (4), the monitoring mode is set by operating the touch panel 66. This monitoring mode is set by an operator pressing the monitoring mode settings button (not shown). When this monitoring mode is selected, the spray control portion 31 repeatedly moves to each section in order until the time of the regular cycle lubricant application to monitor via sensors. For example, the monitoring mode to be described later (Steps G1-G10 described below) may be operated regularly.

Figure 9:
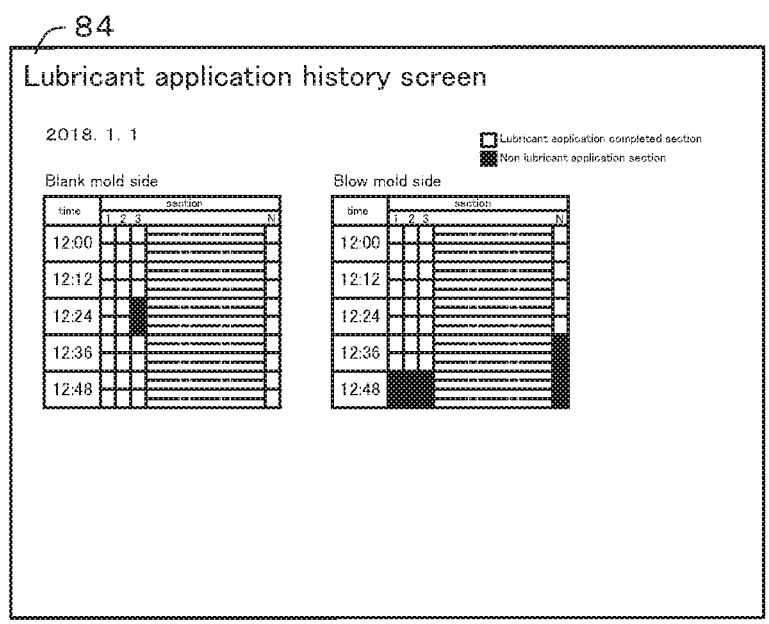
FIG. 9 illustrates a lubricant application history screen.

FIG. 9 is a diagram showing a lubricant application history screen 84. Referring to FIGS. 1 and 9, the lubricant application history screen 84 is a screen for displaying the application history for the spraying the mold release lubricants L1 and L2 by the first spray portion 30A and the second spray portion 30B onto the blank molds 10 and the blow molds 18. The lubricant application history screen 84 displays, for example, the mold release lubricant application history for each cycle of the mold release lubricant spraying operation. FIG. 9 shows images of the blank mold lubricant application history and the blow mold lubricant application history.

Regarding the above setting in (5), each operation is conducted by an operator pressing the relevant button displayed on the touch panel 66.

Subsequently, an example of the operations conducted by the spray portions 30 is described.

Referring to FIGS. 1 and 8, the spray control portion 31 is configured so as to execute an application mode wherein both the first spray portion 30A and the second spray portion 30B apply the mold release lubricant L, and an application mode wherein either of the first spray portion 30A or the second spray portion 30B applies the mold release lubricant L.

Examples of the operation by the spray portion 30A are presented such as (i) regular cycle spraying operation for the mold release lubricants L1 and L2 based on the settings input in the regular cycle lubricant application setting screen 82 (see FIG. 8), (ii) temporary lubricant spraying operation of the mold release lubricants L1 and L2 based on the settings input in the temporary lubricant application setting screen (not shown), and (iii) abnormality detecting operations in the monitoring mode.

In this embodiment, the above operation (i) is also referred to as the regular cycle lubricant application operation. In this embodiment, the above operation (ii) is also referred to as a temporary lubricant application operation.

In the regular cycle lubricant application operation (i), the settings input in the regular cycle lubricant application setting screen 82 include (i-1), a simultaneous mold release lubricant spraying operation conducted by both the first spray portion 30A and the second spray portion 30B, and (i-2), a mold release lubricant spraying operation conducted by either of the first spray portion 30A or the second spray portion 30B.

In the temporary lubricant application operation (ii), the settings input in the temporary lubricant application setting screen (not shown) include (ii-1), a simultaneous mold release lubricant spraying operation conducted by both the first spray portion 30A and the second spray portion 30B, and (ii-2), a mold release lubricant spraying operation conducted by either of the first spray portion 30A or the second spray portion 30B.

The regular cycle lubricant application operation (i) and the temporary lubricant application operation (ii) both also monitor whether any spray abnormalities of the mold release lubricant occur or not, along with monitoring abnormal residual glass lump for the blank mold 10 and the blow mold portion 9. (i) the regular cycle lubricant application operation, (ii) the temporary lubricant application operation, and (iii) the abnormality detecting operation are explained below in order.

Figure 10:
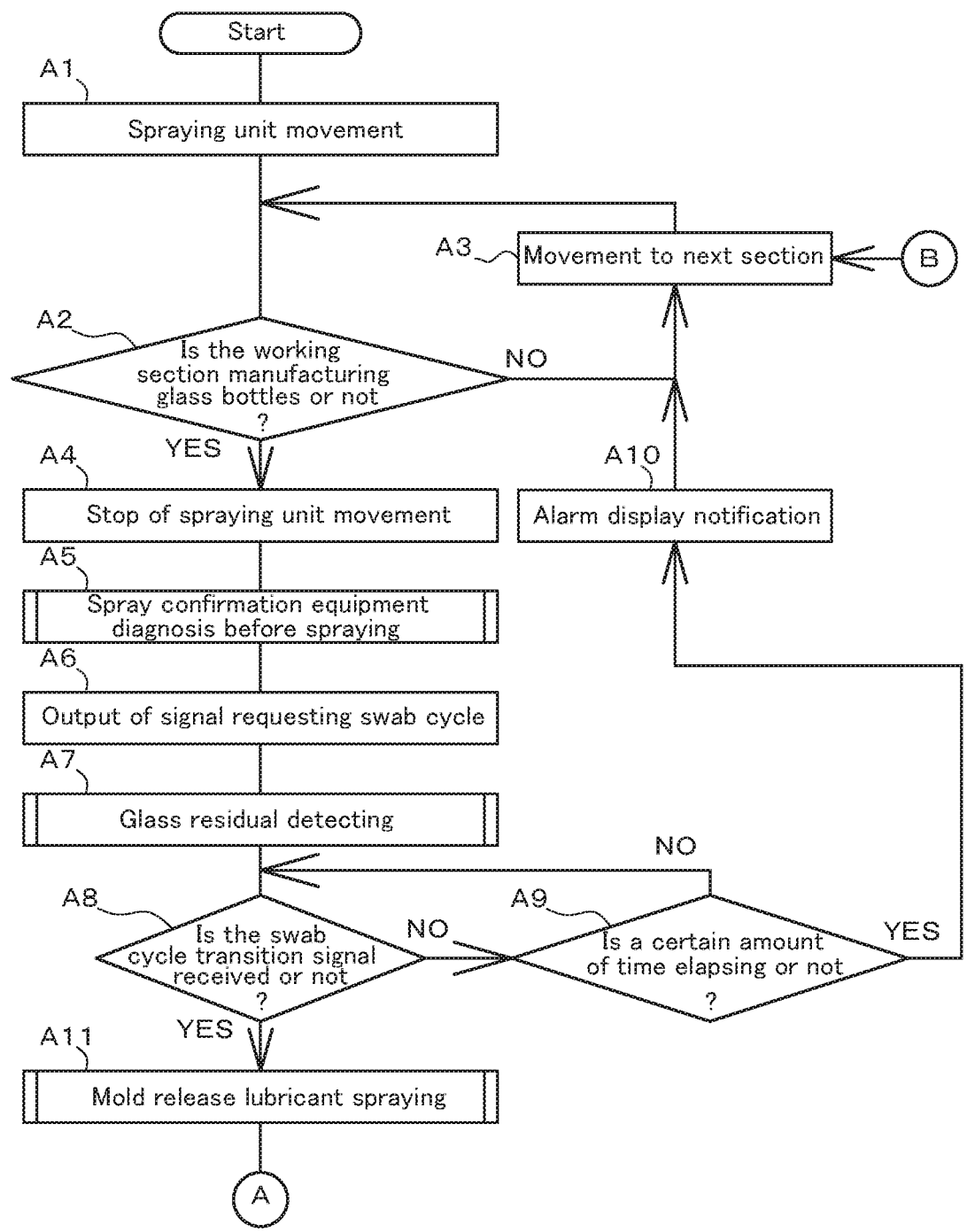
FIG. 10 is a flow chart explaining one example of the mold release lubricant spraying operation conducted by both (i-1) the first spray portion and the second spray portion as part of the (i) regular cycle lubricant application operation.
Figure 11:
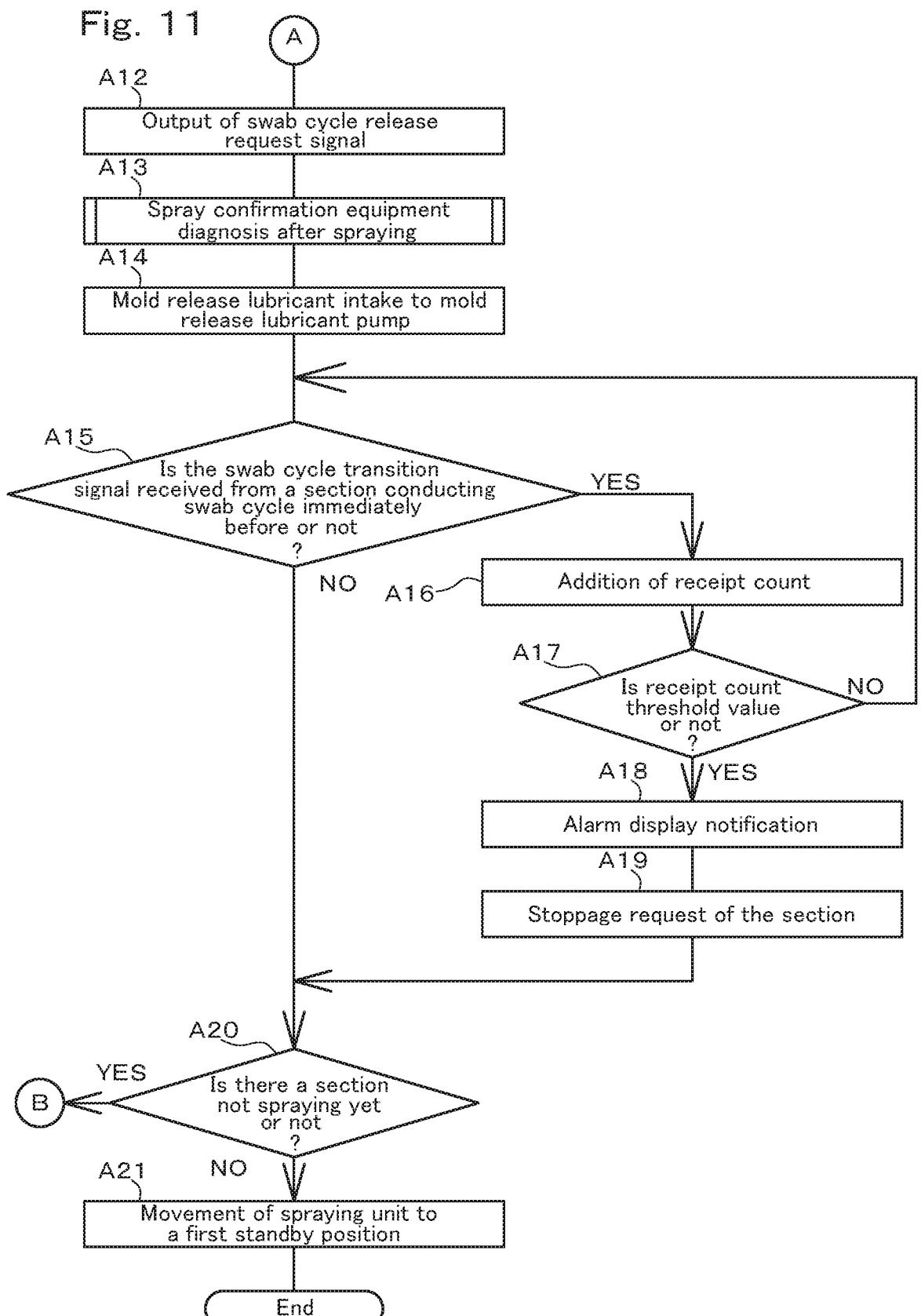
FIG. 11 is a flow chart explaining one example of the mold release lubricant spraying operations conducted by both (i-1) the first spray portion and the second spray portion as part of the (i) regular cycle lubricant application operation.

FIGS. 10 to 11 are flow charts explaining one example of the operations conducted by (i-1) both the first spray portion 30A and the second spray portion 30B during the mold release lubricant spraying operation as part of (i) the regular cycle lubricant application operation. Note that the following explanation refers to the flow charts as well as diagrams other than the flow charts.

The spray control portion 31 starts operations after reading data, which is set by operating the operation display portion 32, specifying subjects of the mold release lubricant application (the sections 5, blank molds 10, and blow molds 18).

The spray control portion 31 drives the transport motors 37A and 37B to start to move the spraying units 34A and 34B towards the set section 5 (step A1). For example, as shown in FIG. 1, by controlling of the spray control portion 31, the spraying units 34A and 34B are transported from the first standby positions P1 to the section 5 that is designated at the beginning (in FIG. 1, this is the first section). Furthermore, when the spraying units 34A and 34B are already arranged at any of sections 5, the spray control portion 31 transports the spraying units 34A and 34B to the section 5, which is the closest to the section 5 whose mold release lubricant spraying operation is completed, among the sections 5 to which the mold release lubricant is not applied yet, and for which the regular cycle lubricant application operation is specified.

When the spraying units 34A and 34B move in the arrangement direction A1, as is shown in FIG. 1, the nozzles 38A and 38B are manipulated by the manipulators 39A and 39B and arranged at the second standby positions P2A and P2B as positions set outside from the corresponding the blank molds 10 and the blow molds 18. When positioned at the second standby positions P2A and P2B, the nozzles 38A and 38B are arranged on the corresponding base parts 36A and 36B so that the nozzles 38A and 38B avoid contacting the base parts and the like, of each section 5 when moving to the spraying units 34A and 34B in the arrangement direction A1.

As a result, the spray control portion 31 operates the spray portions 30A and 30B to apply the mold release lubricants L1 and L2 to at least one of the sections 5. Furthermore, spray control portion 31 controls the spray portion 30A and the spray portion 30B so that the two spray portions 30A and 30B are positioned at the same section 5.

The spray control portion 31 determines whether or not the designated section 5 is operating the glass bottle manufacturing (Step A2). When the spray control portion 31 does not receive a signal from the glass bottle manufacturing control portion 6 indicating that the designated section 5 is operating the glass bottle manufacturing, in other words, when the designated section 5 is not conducting the glass bottle manufacturing (NO for Step A2), it conducts Step A3. Specifically, the spray control portion 31 changes the target section 5 to the next section 5 of said designated section 5 (section 5 designated by operating the touch panel 66). In this case, the spray control portion 31 operates Step A3 and then retries the Step A2.

On the other hand, when the spray control portion 31 determines that the designated section 5 operates glass bottle manufacturing, in other words, when it receives a signal indicating that the designated section 5 is operating the glass bottle manufacturing from the glass bottle manufacturing control portion 6(YES in Step A2), it controls the transport motors 37A and 37B to stop the spraying units 34A and 34B in front of the designated section 5 (Step A4).

Figure 12:
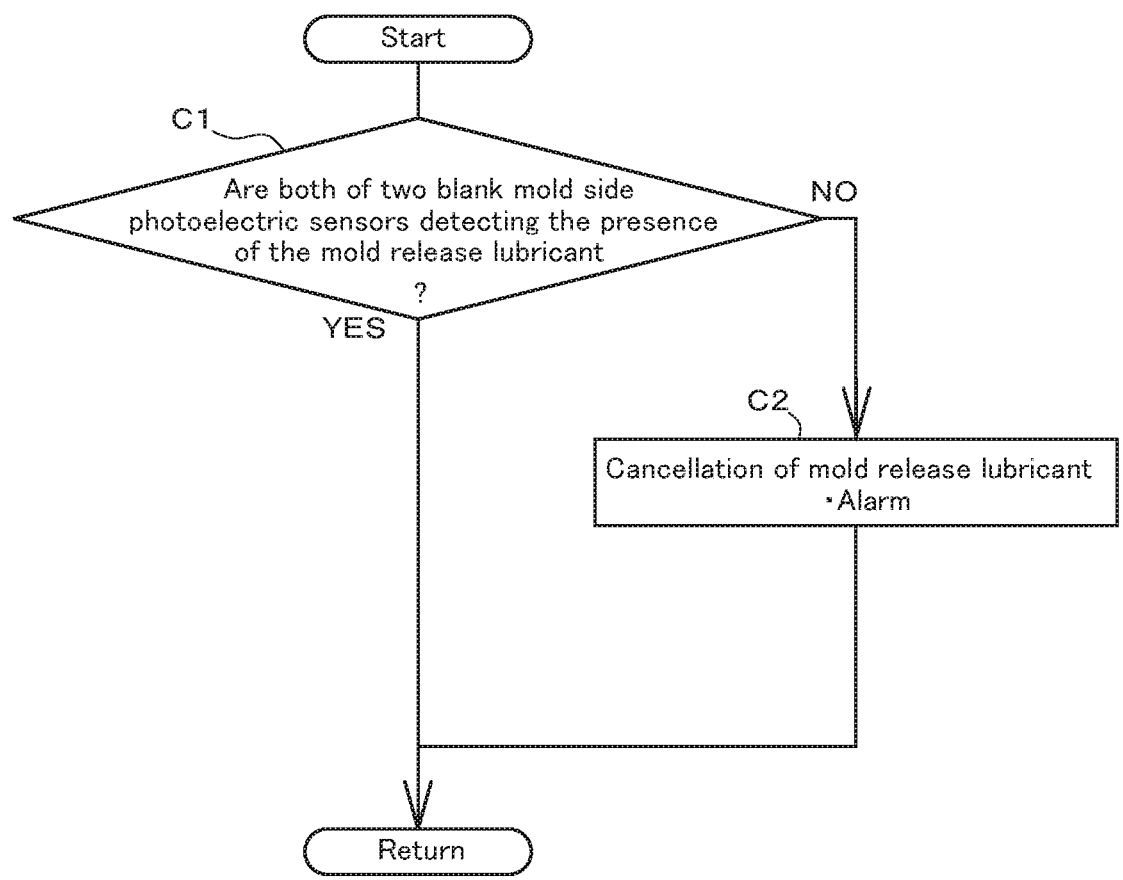
FIG. 12 is a flow chart showing one example of a diagnosis (Step A5) conducted by a spray confirmation equipment before spraying.

Next, the spray control portion 31 conducts a spray confirmation equipment diagnosis before spraying (Step A5). FIG. 12 is a flow chart showing an example of the spray confirmation equipment diagnosis before spraying (Step A5). This spray confirmation equipment diagnosis before spraying is one example of the "inspection mode to check for abnormalities" of this invention, and is operated before the mold release lubricant application process.

Referring to FIG. 12, during the diagnosis with the spray confirmation equipment before spraying, the spray control portion 31 determines whether or not both the photoelectric sensors 56A and 57A of the abnormal spray detecting portion 41A are detecting the mold release lubricant L1 (Step C1). For example, if light from the lighting portion to the detecting portion is blocked for both the photoelectric sensors 56A and 57A due to the mold release lubricant L1 filled in the syringe 52A, the spray control portion 31A determines that the photoelectric sensors 56A and 57A are detecting the mold release lubricant L1 (YES in step C1). In other words, the spray control portion 31 determines that the necessary amount of mold release lubricant is built up in the syringe 52A of the mold release lubricant pump 47A.

If YES for Step C1, the spray control portion 31 completes the spray confirmation equipment diagnosis before spraying (Step A5).

On the other hand, if either of the photoelectric sensor 56A or 57A is not detecting the mold release lubricant L1, in other words, if sufficient mold release lubricant L1 is not filled in the syringe 52A (NO in Step C1), the control portion 31 displays that an abnormality occurs to the mold release lubricant pump 47A, on the touch panel 66 and cancels the lubricant application operation (Step C2). Thus, if the abnormal spray detecting portion 41A detects a spray abnormality (NO in Step C1), the spray control portion 31 determines that an abnormality occurs to the mold release lubricant pump 47A. Furthermore, the spray control portion 31 cancels all lubricant application operation, which could result in a leak, and moves both the spraying units 34A and 34B to the first standby positions P1 (Step C2). At this time, the spray control portion 31 displays an alarm on the touch panel 66 to notify the abnormality. This completes the spray confirmation equipment diagnosis before spraying. Same as the processing of Step C1, the photoelectric sensors 56B and 57B operate a diagnosis of the mold release lubricant pump 47B. Furthermore, the mold release lubricant pump 47B diagnosis using the photoelectric sensors 56B and 57B is the same as the mold release lubricant pump 47A diagnosis using the photoelectric sensors 56A and 57A (Step C1, C2). Thus, a detailed explanation of the mold release lubricant pump 47B diagnosis process using the photoelectric sensors 56B and 57B is omitted.

Once again referring to FIGS. 10 and 11, after the spray confirmation equipment diagnosis before spraying (Step A5), the spray control portion 31 outputs a swab request signal (signal requesting to transit from the glass bottle manufacturing cycle to the swab cycle for the section 5 in which the mold release lubricant spraying operation is conducted) (Step A6) to the glass bottle manufacturing control portion 6.

The glass bottle manufacturing cycle and the swab cycle are the cycles configured in the glass bottle manufacturing portion 3, which includes the blank molds 10, the neck rings 12, and the blow molds 18. The glass bottle manufacturing cycle is the cycle for forming the glass bottles 103 in the glass bottle manufacturing portion 3. The swab cycle is an operating cycle that differs from the glass bottle manufacturing cycle, in which the gob 101 is not charged into the blank mold 10.

The spray control portion 31 conducts glass residual detecting operation (Step A7) after outputting the swab request signal.

Next is an explanation of the glass residual detecting operation (Step A7). This mold abnormality detecting operation is one example of the "inspection mode to check abnormalities" of this invention, and is conducted before the mold release lubricant application operation.

Figure 13:
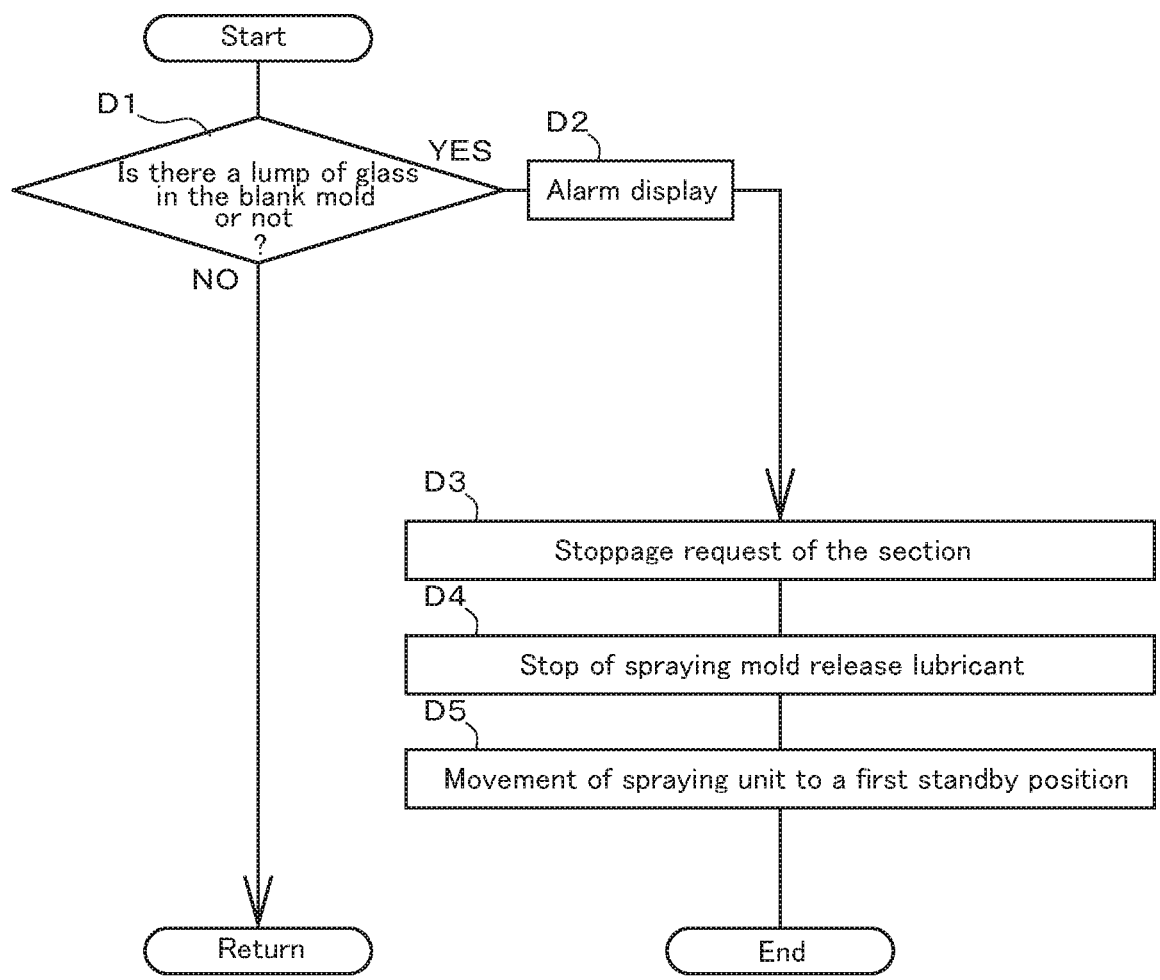
FIG. 13 is a flow chart explaining one example of processes conducted by a glass residual detecting operation.

FIG. 13 is a flow chart explaining one example of processing of the glass residual detecting operation. Referring to FIG. 13, at first the spray control portion 31 determines whether or not a lump of glass (gob 101 or parison 102) remains inside the cavity 10c of each blank mold 10, which the mold release lubricant is sprayed (Step D1).

Explaining an example of this determination, the spray control portion 31 reads image data obtained by the glass residual detecting portion 42A capturing an image of the cavity 10c of each blank mold 10, which the mold release lubricant is sprayed. Then, this image data is collated with predetermined data obtained by modeling the lump of glass, and if the degree of coincidence of these data is less than a predetermined value, the spray control portion 31 determines that the lump of glass (gob 101 or parison 102) does not exist inside the cavity 10c described above (NO in step D1).

When the lump of glass does not exist in the blank mold 10, the spray control portion 31 finishes the residual abnormality detecting process and confirms the reception of the swab cycle transition signal (Step A8).

On the other hand, in Step D1, the image data captured by the glass residual detecting portion 42A is collated with predetermined data, and if the degree of coincidence of these data is more than the predetermined value, the spray control portion 31 determines that the lump of glass (gob 101 or parison 102) exists in the cavity 10c described above (YES in step D1). That is, the glass residual detecting portion 42A detects a lump of glass. Then, the spray control portion 31 determines that an abnormality occurs, and displays on the touch panel 66 that the lump of glass remains in the blank mold 10 (Step D2).

When the alarm display appears (Step D2), the spray control portion 31 outputs a signal to the glass bottle manufacturing control portion 6 requesting to stop the glass bottle manufacturing operation in the section 5 at which the spraying units 34A and 34B are arranged (Step D3). As a result, the glass bottle manufacturing operation in the section 5 stops.

Next, the spray control portion 31 stops spraying the mold release lubricant onto the glass bottle manufacturing portion 3 by the spraying units 34A and 34B (Step D4). Then, the spray control portion 31 drives the transport mechanisms 33A and 33B to move the spraying units 34A and 34B to the first standby positions P1 (Step D5). As a result, the mold release lubricant spraying operation is suspended halfway.

In the glass bottle manufacturing cycle, the process for the blow molds 18 is subsequent to the process of the blank molds 10. Therefore, the blow molds 18 enters the swab cycle, one cycle later than the cycle of the blank molds 10. As a result, after the Step D1 processing, it is determined whether or not a lump of glass (parison 102 or gob 103) remains inside the cavity 18c of each blow mold 18, which the mold release lubricant is sprayed. Processing of the glass residual detecting for the blow molds 18 is the same as processing of the glass residual detecting for the blank molds 10. Thus, a detailed explanation of processing of the glass residual detecting for the blow molds 18 is omitted.

Again, referring to FIGS. 10 and 11, after the glass residual detecting operation, the spray control portion 31 determines whether or not a swab cycle transition signal is received from the glass bottle manufacturing control portion 6 (Step A8). The swab cycle transition signal is a signal generated from the glass bottle manufacturing control portion 6 when the glass bottle manufacturing control portion 6 starts executing the swab cycle.

When the spray control portion 31 receives the swab cycle transition signal from the glass bottle manufacturing control portion 6 (YES in Step A8), the mold release lubricant spraying operation is conducted (Step A11). On the other hand, after the spray control portion 31 outputs the swab request signal, if the swab cycle transition signal is not received from the glass bottle manufacturing control portion 6 (NO in Step A8 and YES in Step A9) even after a certain amount of time elapsing, an alarm is displayed on the touch panel 66 and an abnormality is notified (Step A10). Afterward, processing of the Step A3 is operated. In Step A3, the spray control portion 31 drives the transport motors 37A and 37B to move the spraying units 34A and 34B towards the next section 5 set in the settings.

As described above, when the spray control portion 31 receives the swab cycle transition signal (YES in Step A8), it sprays the mold release lubricant (Step A11). That is, the spray control portion 31 causes the spray portions 30A and 30B to spray the mold release lubricant when the glass bottle manufacturing portion 3 is in the swab cycle. Thus, in this embodiment, the spray control portion 31 is triggered by receiving the swab cycle transition signal from the glass bottle manufacturing portion 3 to cause the spray portions 30A and 30B to start the mold release lubricant L1 and L2 spray operation.

Subsequently, the mold release lubricant spraying operation will be described (step A11). Referring to FIG. 1 and FIGS. 3 to 5, the spray control portion 31 operates the mold release lubricant spraying operation on the blank molds 10 and then conducts the mold release lubricant spraying operation on the blow molds 18. That is, when applying the mold release lubricant L to both the blank molds 10 and the blow molds 18 at the same section 5, the spray control portion 31 applies the mold release lubricant L1 to the blank molds 10 via the first spray portion 30A, and applies the mold release lubricant L2 to the blow molds 18 via the second spray portion 30B.

Specifically, the spray control portion 31 first inserts the nozzles 38A from the second standby position P2A on the base parts 36A into the corresponding cavities 10c of the blank molds 10. Subsequently, the spray control portion 31 sprays the mold release lubricant L1 on the inner surface of the cavities 10c of the blank molds 10 by driving the mold release lubricant pump 47A while moving the nozzles 38A in the vertical direction. Then, when the spraying operation of the mold release lubricant L1 is completed, the spray control portion 31 moves the nozzles 38A to the second standby position P2A on the base parts 36A.

Subsequently, the spray control portion 31 inserts the nozzles 38B into the cavities 18c of the corresponding blow molds 18 from the second standby position P2B on the second base 36B. Then, the spray control portion 31 sprays the mold release lubricant L2 by moving the nozzles 38B in the vertical direction by driving the mold release lubricant pump 47B. At this time, the spray control portion 31 sprays the mold release lubricant L2 on locations set by the regular cycle lubricant application setting screen 82, among the inner surfaces of the cavities 12c of the neck rings 12, the upper surfaces of the cavities 18c of the blow molds 18, the inner surfaces of the cavities 18c, and the bottom forming areas 19a. When the spraying operation of the mold release lubricant L2 is completed, the spray control portion 31 moves the nozzles 38B to the second standby position P2B on the base parts 36B.

The above describes one example of the mold release lubricant spraying operation (Step A11).

Once again referring to FIGS. 10 and 11, after completing the mold release lubricant spraying operation (Step A11), the spray control portion 31 outputs a swab cycle release request signal to the glass bottle manufacturing control portion 6 (Step A12). Receiving this signal, the glass bottle manufacturing control portion 6 returns the setting from the swab cycle to the glass bottle manufacturing cycle and restarts the glass bottle manufacturing operation in the section 5 in which the mold release lubricant spraying operation by the spraying units 34A and 34B is completed. That is, molding the glass bottle 103 from the gob 101 is restarted.

Subsequently, the spray control portion 31 operates the spray confirmation equipment diagnosis after spraying (Step A13). This spray confirmation equipment diagnosis after spraying is one example of "the inspection mode to check for abnormalities" of this invention, and is conducted after the mold release lubricant application operation starts.

Figure 14:
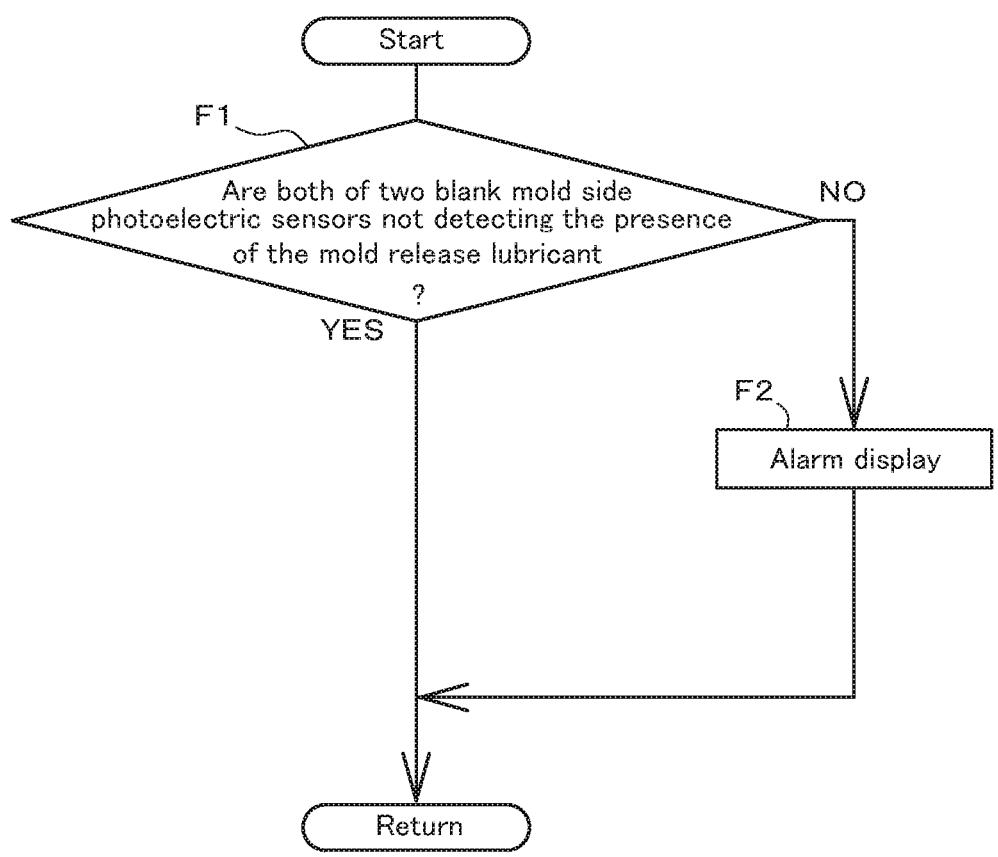
FIG. 14 is a flow chart showing one example of a diagnosis (Step A13) conducted by the spray confirmation equipment after spraying.

FIG. 14 is a flow chart showing an example of the spray confirmation equipment diagnosis after spraying (Step A13). Referring to FIG. 14, during the diagnosis by the spray confirmation equipment after spraying, the spray control portion 31 determines whether or not the any of photoelectric sensors 56A and 57A of the abnormal spray detecting portion 41A are detecting the mold release lubricant L1 (Step F1). For example, if light from the lighting portion to the detecting portion is not blocked by both photoelectric sensors 56A and 57A due to the mold release lubricant L1 discharged from the syringe 52A, the spray control portion 31 determines that the photoelectric sensors 56A and 57A are not detecting the mold release lubricant L1 (YES in Step F1). In other words, the spray control portion 31 determines that the mold release lubricant L1 is sprayed from the syringe 52A of the first mold release lubricant pump L1 as planned.

If YES in Step F1, the spray control portion 31 completes the spray confirmation equipment after spraying (Step A13).

On the other hand, if either of the photoelectric sensor 56A or 57A is detecting the mold release lubricant L1, in other words, if the sufficient mold release lubricant L1 is not discharged from the syringe 52A due to a clogged nozzle (NO in Step F1), the spray control portion 31 displays that an abnormality occurs to the mold release lubricant pump 47A on the touch panel 66 (Step F2). Thus, if the abnormal spray detecting portion 41A detects a spray abnormality (NO in Step F1), the spray control portion 31 determines that an abnormality occurs to the mold release lubricant pump 47A. Note that same as the processing in Step F1, the photoelectric sensors 56B and 57B conduct a diagnosis of the mold release lubricant pump 47B. Furthermore, the mold release lubricant pump 47B diagnosis using the photoelectric sensors 56B and 57B is the same as the mold release lubricant pump 47A diagnosis using the photoelectric sensors 56A and 57A (Step F1, F2). Thus, a detailed explanation of the mold release lubricant pump 47B diagnosis process using the photoelectric sensors 56B and 57B is omitted.

When the diagnosis by the spray confirmation equipment after spraying is completed, the spray control portion 31 causes the syringes 52A and 52B of the mold release lubricant pumps 47A and 47B to intake the mold release lubricants L1 and L2 (Step A14). As a result, the mold release lubricants L1 and L2 for the next mold release lubricant spraying operation are filled in the syringes 52A and 52B.

After the mold release lubricant intake operation (Step A14), the spray control portion 31 determines (Step A15) whether or not the swab cycle transition signal (a signal indicating that the swab cycle is being operated) is received regarding the section 5 where the mold release lubricant spraying operation is conducted immediately before. This swab cycle transition signal is output from the glass bottle manufacturing control portion 6 at regular intervals during the swab cycle. When returning to the glass bottle manufacturing cycle, the swab cycle transition signal is cut off.

When the spray control portion 31 receives the swab cycle transition signal, in other words, when the swab cycle is not completed (YES in Step A15), one swab cycle transition signal is added to the receipt counts (Step A16). When the number of received times of the swab cycle transition signal is less than the predetermined threshold value (NO in Step A17), the spray control portion 31 repeats the processing of steps A15 to A17.

On the other hand, when the number of swab cycle transition signals reaches a predetermined number, that is, when the spray control portion 31 receives a signal indicating that the swab cycle is not completed yet for a certain period of time (YES in Step A17), an alarm indicating that the section 5 where the mold release lubricant spraying operation is conducted immediately before, has not been returned to the glass bottle manufacturing cycle, is displayed on the touch panel 66 (Step A18).

Subsequently, the spray control portion 31 outputs a signal requesting to stop the glass bottle manufacturing operation in the section 5, which is the object of the alarm display in Step A18, to the glass bottle manufacturing control unit 6 (Step A19). As a result, the spray control portion 31 stops the glass bottle manufacturing operation in the section 5 in which the swab cycle cannot normally shift to the glass bottle manufacturing cycle.

As described above, in the present embodiment, the spray control portion 31 determines whether or not the swab cycle is completed after causing the spray portions 30A and 30B to perform the mold release lubricant application operation. Then, the spray control portion 31 determines whether or not to perform the abnormality notification (step A18) based on the determination result.

When the spray control portion 31 does not receive the swab cycle transition signal for the section 5 where the mold release lubricant spraying operation is conducted immediately before (when the swab cycle is transitioned to the glass bottle manufacturing cycle, and NO in Step A15), or goes through the processing of Step A19, the spray control portion 31 determined whether or not there is a section 5 where the mold release lubricant spraying operation is not conducted yet among the sections 5 designated by the operation display portion 32 (Step A20).

When the mold release lubricant spraying operation is completed for all of the sections 5 designated by the operation display portion 32 (NO in Step A20), one cycle of the mold release lubricant spraying operation is completed. At this time, the spray control portion 31 moves (returns) the spray units 34A and 34B to the first standby positions P1 by driving the transport mechanisms 33A and 33B (step A21). This completes one cycle of the mold release lubricant spraying operation.

On the other hand, when there is a section 5 in which the mold release lubricant spraying operation is not conducted yet (YES in Step A20), the spray control portion 31 drives the transport mechanisms 33A and 33B. As a result, the spray control portion 31 starts moving the spraying units 34A and 34B toward the section closest to the section 5 where immediately before the mold release lubricant spraying operation is conducted among the sections 5 where the mold release lubricant spraying operation is not conducted yet although is designated thereto (step A3). At this time, the two spraying units 34A and 34B are moved together in the arrangement direction A1, and are thus arranged at the same section 5. That is, the two spraying units 34A and 34B are not arranged in the separate sections 5. Then, the processing after step A4 onward is repeated.

The above is one example of the operation of the glass bottle manufacturing equipment 1 when both the first spray portion 30A and the second spray portion 30B are set to simultaneously perform the mold release lubricant spraying operation (in the case of (i-1)).

Subsequently, one example of the operation of the glass bottle manufacturing equipment 1 when either of the first spray portion 30A or the second spray portion 30B is set to conduct the mold release lubricant spraying operation (in the case of (i-2)) is explained. The example of the above operation (i-2) is mostly described about processing different from the aforementioned processing (i-1), and the description of the same configuration as the aforementioned case (i-1) may be omitted.

Referring again to FIGS. 10 and 11, in the above case (i-2), the spraying control portion 31 causes either of the first spray portion 30A or the second spray portion 30B for which the mold release lubricant spraying operation is set on the regular cycle lubricant application setting screen 82, to be processed same as the case (i-1) described above. On the other hand, the spray control portion 31 sets either of the first spray portion 30A and the second spray portion 30B, that is, the other spray portion 30 for which the mold release lubricant application operation is not conducted, to standby at the first standby position P1 set outside each section 5 (outside the glass bottle manufacturing portion 3). As described above, in this case (i-2), the spray control portion 31 controls the first spray portion 30A and the second spray portion 30B to conduct mutually different operations from each other. Then, the spray control portion 31 does not conduct the aforementioned processing (i-1) on the other spray portion 30.

Next is a description of the temporary lubricant application operation (ii). In the temporary lubricant application operation (ii), the simultaneous mold release lubricant application operation conducted by both the first spray portion 30A and the second spray portion 30B (ii-1) is the same as the regular cycle lubricant application operation wherein both the first spray portion 30A and the second spray portion 30B spray the mold release lubricant simultaneously (i1). Therefore, the description in this case is omitted.

Figure 15A:
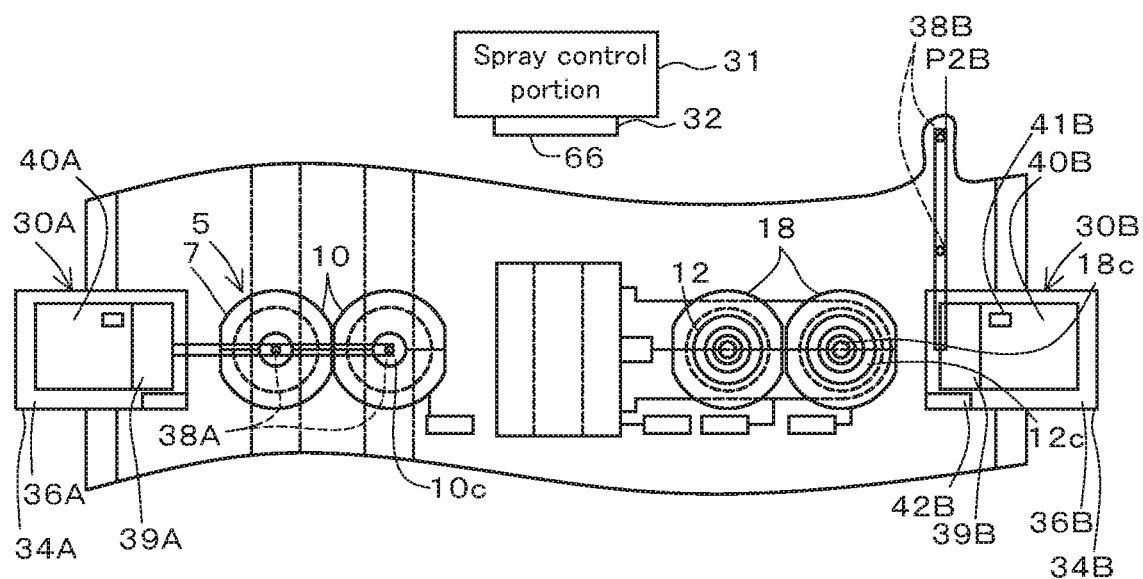
FIG. 15(A) is a schematic diagram showing one example of operations when only the first spray portion of a system that consists of the first spray portion and the second spray portion conducts mold release lubricant spraying operation during (ii) temporary lubricant application.
Figure 15B:
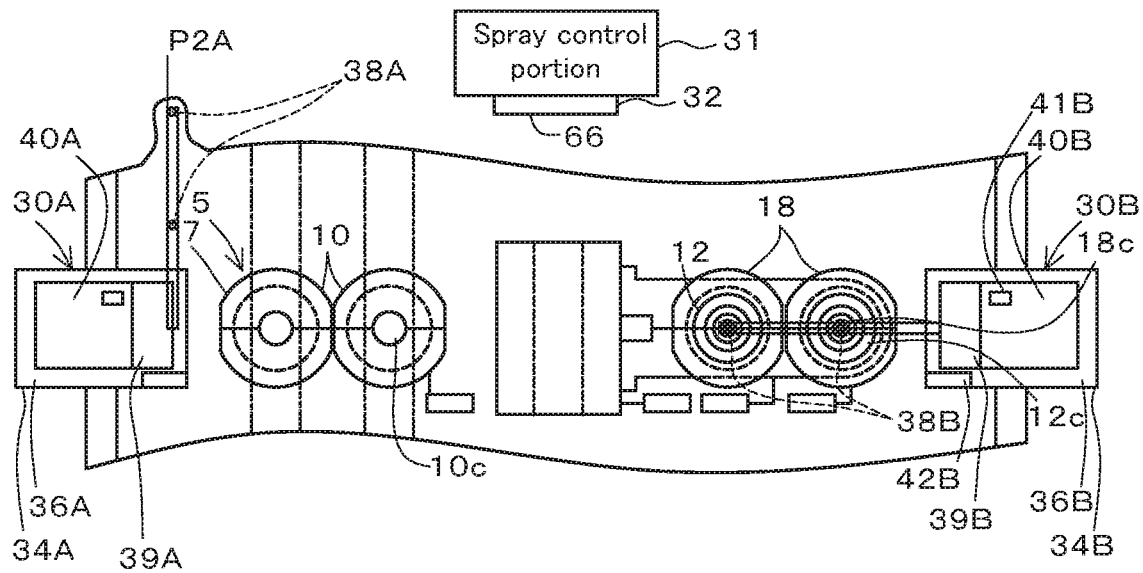
FIG. 15(B) is a schematic diagram showing one example of operations when only the second spray portion of a system that consists of the first spray portion and the second spray portion conducts the mold release lubricant spraying operation during (ii) temporary lubricant application.

In addition, in this temporary lubricant application, the spray control portion 31 may have either of the first spray portion 30A or the second spray portion 30B to apply the mold release lubricant L (case ii-2). In this case, the same processing as the above (i-2) is conducted (when either of the first spray portion 30A or the second spray portion 30B conducts the mold release lubricant spraying operation in the regular cycle lubricant application). However, the spray control portion 31 arranges the first spray portion 30A and the second spray portion 30B at the same section 5. Further, the spray control portion 31 causes the spray portions 30 to which the mold release lubricant L is not applied, to stand by at the second standby positions P2 (P2A, P2B) set to the side of the corresponding blank molds 10 or blow molds 18 of the section 5. When only the first spray portion 30A among the spray portions 30A and 30B sprays the mold release lubricant L1, the nozzles 38A sprays the mold release lubricant L1 toward the blank molds 10 as shown in FIG. 15(A), while the nozzles 38B is on standby at the second standby position P2B. When only the second spray portion 30B among the spray portions 30A and 30B sprays the mold release lubricant L2 as shown in FIG. 15(B), while the nozzles 38B sprays the mold release lubricant toward the blow molds 18, the nozzles 38A is on standby at the second standby position P2A. In this way, the spray control portion 31 controls the first spray portion 30A and the second spray portion 30B to conduct mutually different operations from each other.

The above explains the temporary lubricant application operation (ii).

Next is an explanation of one example of operations conducted as part of (iii) the abnormality detecting operation during the monitoring mode for the blank mold 10.

Figure 16:
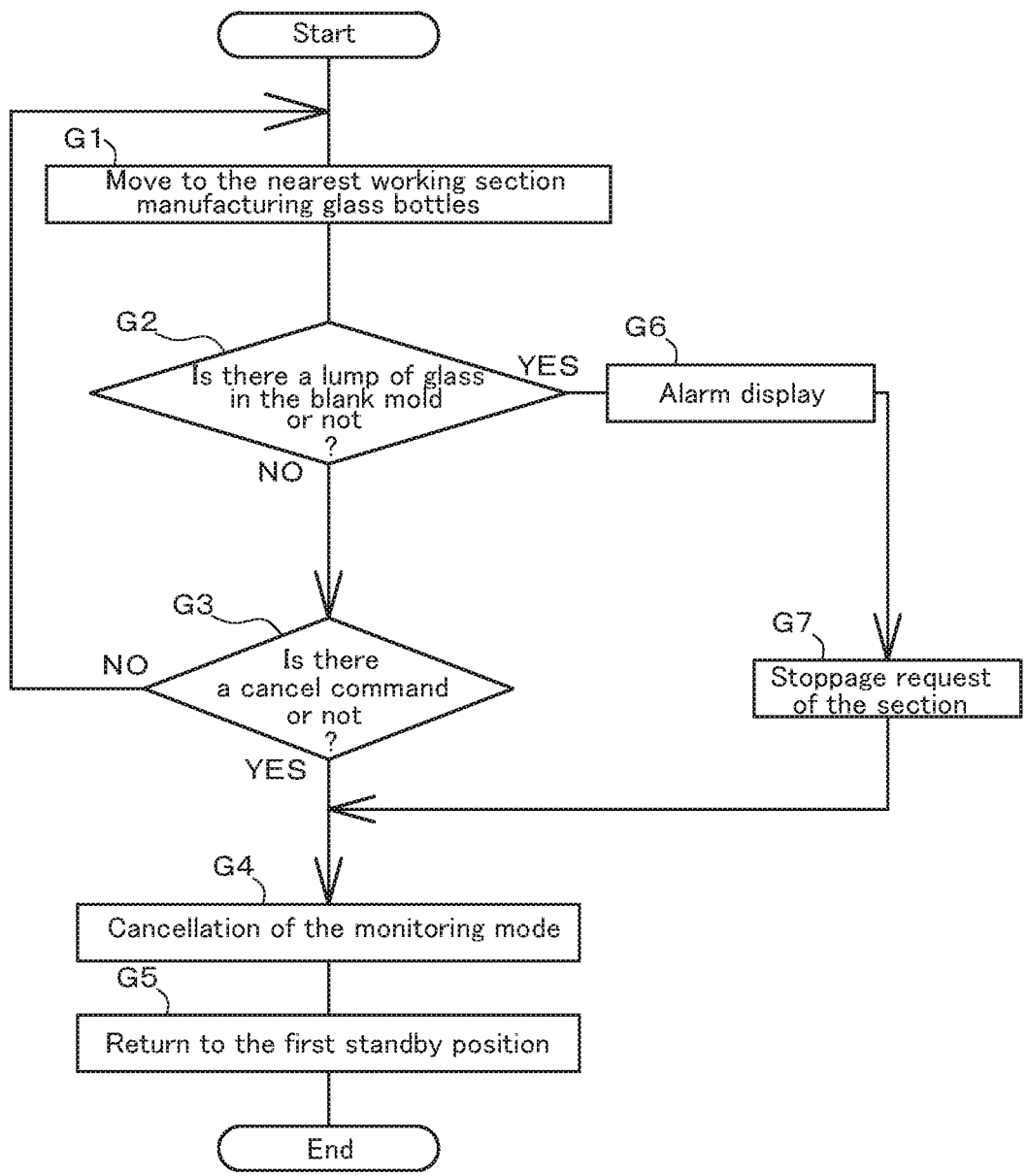
FIG. 16 is a flow chart showing one example of operations conducted by an abnormality detecting operation during a monitoring mode for a blank mold.

When an operator selects and executes the monitoring mode for the blank mold 10 on the operation screen, the abnormality detecting operation starts. As a result, the mold release lubricant spraying operation is not conducted. That is, the spray control portion 31 uses the glass residual detecting portion 42 (sensor) for the section 5 in which the glass bottle manufacturing cycle is conducted between the lubricant application cycles (when the mold release lubricant spraying is not conducted) to detect abnormalities. FIG. 16 is a flow chart showing one example of processing conducted during the monitoring mode for the blank mold 10. Referring to FIG. 16, in the monitoring mode for the blank mold 10, the spray control portion 31 moves the spraying unit 34A from the first standby position P1 to the section 5 conducting the glass bottle manufacturing operation (where the glass bottle manufacturing operation signal is output) closest to the first standby position P1 (Step G1). That is, the abnormality detecting operation is conducted on the section 5 during the glass bottle manufacturing operation. Here, for example, as shown in FIG. 1, the nozzles 38A and 38B are both arranged at the second standby positions P2 (P2A, P2B).

Next, the spray control portion 31 determines whether or not a lump of glass (gob 101 or parison 102) remains during the timing from when the parison 102 is removed until when the next gob 102 is loaded in the cavity 10c of each blank mold 10 of the sections 5 at which the spraying unit 34A is arranged (Step G2). An example of this determination is the same as Step D1 of the residual abnormality detecting operation (Step A10).

When the lump of glass does not remain in the cavity 10c of the blank mold 10 at the above timing (NO in Step G2), the presence/absence of the cancel command is determined (Step G3). One example of the cancel commands includes that the start time of the regular cycle lubricant operation comes during the monitoring mode, that the cancel command is issued by operating the touch panel 66 by an operator, or that a time-up occurs. The time-up means that a predetermined time elapses since the start of execution of the monitoring mode. The time period from the start of execution of the monitoring mode to the time up may be constant or may be set arbitrarily by operating the touch panel 66.

In Step G3, if a cancel command is not issued (NO in Step G3), the spray control portion 31 repeats the processing after Step G1. In addition, in the processing of Step G1 after the second time, the spraying control portion 31 moves the spraying unit 34A to the section 5 in the bottle manufacturing operation and is closest to the section in which the abnormality detecting operation is conducted immediately before.

On the other hand, when it is determined for Step G3 that the cancel command is issued (YES in Step G3), the spray control portion 31 cancels the monitoring mode (Step G4) and returns the spraying unit 34A to the first standby position P1 (Step G5). As a result, the monitoring mode is terminated.

On the other hand, when it is determined in Step G2 that the lump of glass (gob 101 or parison 102) is present in the cavity 10c (YES in Step G2), the spray control portion 31 determines that an abnormality occurs. Then, the spray control portion 31 displays on the touch panel 66 that the lump of glass remains in the blank mold 10 (Step G6).

When the alarm display operation (Step G6) is conducted, the spray control portion 31 outputs a signal to the glass bottle manufacturing control portion 6 requesting glass bottle manufacturing stoppage in the section 5 at which the spraying unit 34A is arranged (Step G7). As a result, the glass bottle manufacturing operation in the section 5 is stopped. Then, the processes of steps G4 and G5 are conducted.

Since the abnormality detecting operation for the blow molds 18 using the spray unit 34B is the same as the abnormality monitoring mode for the blank molds 10 using the spraying unit 34A described above, detailed description thereof is omitted.

As described above, according to the present embodiment, the spray control portion 31 operates the mold release lubricant application to the blank molds 10 by the first spray portion 30A and the mold release lubricant application to the blow molds 18 by the second spray portion 30B in association with each other. This optimizes the application mode of the mold release lubricant L1 on the blank molds 10 and the application mode of the mold release lubricant L2 on the blow molds 18. As a result, in the glass bottle molding in which the gob 101 is molded into the parison 102 by the blank mold 10 and the parison 102 is formed into the glass bottle 103 by the blow mold 18, the quality defect in the glass bottle 103 is more reliably suppressed. Further, this prevents running out of the mold release lubricant in the blank molds 10 as well as in the blow molds 18.

Further, according to the present embodiment, the spray control portion 31 arranges the nozzles 38A and the nozzles 38B at the same section 5 in the regular cycle lubricant application and the temporary lubricant application operation (cases if (i-1) and (ii-1)). With this configuration, the nozzles 38A and 38B apply the mold release lubricants L1 and L2 to the blank molds 10 and the blow molds 18 of the same section 5. This enables the first spraying section 30A and the second spray section 30B to be arranged so as not to interfere with the forming of the glass bottles with respect to the section 5 that is not the application target of the mold release lubricants L1 and L2.

Further, according to the present embodiment, in the case where the spray control portion 31 controls the first spray portion 30A and the second spray portion 30B to perform different operations from each other in the regular cycle lubricant application and the temporary lubricant application operation (cases of (i-2) and (ii-2)). This configuration more optimizes the timing at which the first spray portion 30A applies the mold release lubricant L1 to the blank molds 10, and the timing at which the second spray portion 30B applies the mold release lubricant L2 to the blow molds 18. Further, when a defect occurs in either of the first spray portion 30A or the second spray portion 30B, it prevents the mold release lubricant L from being sprayed from the defective spray portion 30.

Further, according to the present embodiment, when the spray control portion 31 causes either of the spray portion 30A or 30B to apply the mold release lubricant L in the regular cycle lubricant application, for example, the nozzles 38 to which the mold release lubricant L is not applied, is on standby at the first standby positions P1 set outside the plurality of sections 5. This configuration eliminates a wasteful operation of the nozzles 38 to which the mold release lubricant L is not applied.

Further, according to the present embodiment, when the spray control portion 31 causes either of the spray portion 30A or 30B to conduct the mold release lubricant spraying operation, the spray control portion 31 arranges the nozzles 38A and 38B at the same section 5. At the same time, the nozzles 38 on which the mold release lubricant spraying operation is not conducted, may be made to stand by at the second standby positions P2 set to the side of the blank molds 10 or the blow molds 18. With this configuration, the nozzles 38 that does not conduct the mold release lubricant spraying operation may be made to stand by at a position close to the corresponding blank molds 10 or blow molds 18 in the section 5 where the mold release lubricant L is applied. This shortens the time from the receiving the mold release lubricant spraying operation command to the starting the mold release lubricant spray operation for the nozzles 38 in which the mold release lubricant spraying operation is not conducted.

Further, according to the present embodiment, at least one (both in the present embodiment) of the first spray portion 30A and the second spray portion 30B includes the glass residual detecting portions 42A and 42B, and the spray control portion 31 may detect abnormalities with the glass residual detecting portions 42A and 42B on a plurality of sections 5. This configuration may detect an abnormality in the plurality of sections 5 in the glass bottle manufacturing portion 3 including the blank molds 10 and the blow molds 18 with the spray portions 30. Thus, the spray unit 34 can be used not only for spraying the mold release lubricant but also for detecting an abnormality in the glass bottle manufacturing portion 3.

Further, according to the present embodiment, when the glass residual detecting portion 42 detects a lump of glass, the spray control portion 31 notifies the glass bottle manufacturing control portion 6 of the abnormality and causes the section 5 in which the lump of glass is detected to stop the glass bottle manufacturing operation. According to this configuration, the glass residual detecting portion 42 detects the abnormality in the glass bottle manufacturing portion 3 including the blank molds 10 and the blow molds 18, which causes the malfunction of the spray portions 30. Accordingly, this configuration prevents the nozzles 38 of the corresponding spray portions 30 from entering toward the blank mold 10 or the blow mold 18 in which the lump of glass remains.

Further, according to the present embodiment, the spray control portion 31 causes at least either of the spray portion 30A or 30B to conduct the mold release lubricant application operation during the swab cycle among the glass bottle manufacturing cycle and the swab cycle. In this case, the mold release lubricant application operation by the spray portions 30 can be conducted in the swab cycle in which the glass bottle molding by the blank molds 10 and the blow molds 18 is not conducted temporarily during the operation of the glass bottle manufacturing unit 3. Therefore, the dedicated time for applying the mold release lubricant L can be reduced.

Further, according to the present embodiment, the abnormal spray detecting portion 41 detects the mold release lubricant spray abnormality from the spray portions 30, so that the spray abnormality regarding the mold release lubricant L having high viscosity can be detected more accurately.

The embodiment of the invention is as described above. However, the present invention is not limited to the above embodiment, and various changes can be made as long as they are described in the claims.

(1) In the above embodiment, various constituent features have been described. However, in the present invention, the spray portions 30A and 30B that applies the mold release lubricant L1 to the blank molds 10 and the mold release lubricant L2 to the blow molds 18, and the spray control portion 31 that operates the application of the mold release lubricants L1 and L2 in association with each other, are the essential features, and the other features may not be provided.

(2) In addition, in the above-described embodiment, the configuration in which the mold release lubricant L is applied to the blank molds 10 and the blow molds 18 by spraying the mold release lubricant L in the form of mist has been exemplified, but not limited thereto. As described above, the mold release lubricant L may be applied to the blank molds 10 and the blow molds 18 in a liquid state by a brush and the like.

(3) In addition, in the above-described embodiment, an example is given in which the first spray portion 30A applies the mold release lubricant L1 to the blank molds 10 and then the second spray portion 30B applies the mold release lubricant L2 to the blow molds 18, but not limited thereto. The two spray portions 30A and 30B may simultaneously apply the mold release lubricants L1 and L2 to the corresponding blank molds 10 and blow molds 18.

(4) Moreover, in the abovementioned embodiment, the form which provides the glass residual detecting portions 42A and 42B in the first spray portion 30A and the second spray portion 30B is exemplified, but not limited thereto. For example, the glass residual detecting portion 42 may be provided in either of the spray portion 30A or 30B.

(5) Further, in the abovementioned embodiment, the form is exemplified, in which the spray control portion 31 inspects whether or not there is the mold release lubricant spray abnormality both before and after the mold release lubricant spraying operation is started (steps A5 and A13), but is not limited thereto. For example, the spray control portion 31 may inspect whether or not there is the mold release lubricant spray abnormality before or after the mold release lubricant spraying operation is started.

(6) In addition, in the abovementioned embodiment, the form is exemplified, in which the abnormal spray detecting portions 41A and 41B confirm presence or absence of the mold release lubricant spray abnormality in both the first spray portion 30A and the second spray portion 30B, but is not limited thereto. For example, at least one of the abnormal spray detecting portions 41A and 41B may be omitted.

(7) Further, in the abovementioned embodiment, the spray control portion 31 may prohibit the mold release lubricant spraying operation in the spray portions 30 in which the spray abnormality is detected.

(8) Further, in the abovementioned embodiment, the form of the mold release lubricant pumps 47 is exemplified, in which the compressed air and the mold release lubricant L are in direct contact with each other, but is not limited thereto. The mold release lubricant pumps 47 may be of any pump form as long as it can discharge a predetermined amount of the mold release lubricant L by single discharge operation.

(9) Further, in the abovementioned embodiment, the glass residual detecting portions 42 may detect an abnormality other than the glass lump residual abnormality.

One or all of the above-described embodiment can express the following description as (supplementary note 1)~(supplementary note 15), but this is not a required embodiment.

(Supplementary Note 1)

A mold release lubricant application equipment for glass bottle forming molds, comprising: application portions for applying a mold release lubricant to the glass bottle forming molds, and an application control portion that operates the application portions; wherein the molds are arranged independently along a predetermined arrangement direction;

a plurality of sections comprising the molds are formed along the arrangement direction; the application portions comprise lubricant application parts for applying the mold release lubricant to the molds, transport mechanisms for moving the lubricant application parts among the plurality of the sections along the arrangement direction, and sensors; and the application control portion detects abnormalities in the plurality of sections using the sensors.

(Supplementary Note 2)

The mold release lubricant application equipment for the glass bottle forming molds according to supplementary note 1, comprising:

glass residual detecting portions detect whether or not a lump of glass remains inside at least either of a cavity of the mold, and the glass residual detecting portions comprise the sensors; wherein when the glass residual detecting portions detect the lump of glass, the application control portion notifies an abnormality to a glass bottle manufacturing control portion controlling a glass bottle manufacturing portion including the molds to stop the section where the lump of glass is detected.

(Supplementary Note 3)

A mold release lubricant application equipment for glass bottle forming molds, comprising: application portions for applying mold release lubricant to the glass bottle forming molds, and an application control portion that operates the application portion; wherein the application portions are structured to spray the mold release lubricant onto the molds, the application portions comprise abnormal spray detecting portions to check for any spray abnormality of the mold release lubricant in the application portions, and the application control portion notifies an abnormality, when the abnormal spray detecting portion detects the spray abnormality.

(Supplementary Note 4)

The mold release lubricant application equipment for the glass bottle forming molds according to any of supplementary notes 1 to 3, wherein the molds are provided as blank molds, and the application portion is provided as a first application portion for applying the mold release lubricant to the blank molds.

(Supplementary Note 5)

The mold release lubricant application equipment for the glass bottle forming molds according to any of supplementary notes 1 to 4, wherein the molds are provided as blow molds, and the application portion is provided as a second application portion for applying the mold release lubricant to the blow molds.

(Supplementary Note 6)

The mold release lubricant application equipment for the glass bottle forming molds according to any of supplementary notes 1 to 5, wherein the molds are provided as blank molds and blow molds, the application portions are provided as first application portion for applying the mold release lubricant to the blank molds and second application portion for applying the mold release lubricant to the blow molds, and the application control portion operates the first application portion and the second application portion in association with each other.

(Supplementary Note 7)

The mold release lubricant application equipment for the glass bottle forming molds according to supplementary note 6, wherein the plurality of the blank molds are arranged independently along a predetermined arrangement direction, the plurality of the blow molds are arranged independently along the predetermined arrangement direction, the first application portion comprises first lubricant application part for applying the mold release lubricant, and first transport mechanism for moving the first lubricant application part among the plurality of the blank molds along the arrangement direction, the second application portion comprises second lubricant application part for applying the mold release lubricant, and second transport mechanism for moving the second lubricant application part among the plurality of the blow molds along the arrangement direction, and the application control portion operates the first transport mechanism and the second transport mechanism in association with each other.

(Supplementary Note 8)

The mold release lubricant application equipment for the glass bottle forming molds according to supplementary note 7, wherein a plurality of sections comprising the blank molds and the blow molds are formed along the arrangement direction, and the application control portion operates the first application portion and the second application portion to apply the mold release lubricant to at least one of the sections.

(Supplementary Note 9)

The mold release lubricant application equipment for the glass bottle forming molds according to supplementary note 8, wherein the application control portion controls the first lubricant application portion and the second lubricant application portion so that the first lubricant application part and the second lubricant application part are positioned at the same section.

(Supplementary Note 10)

The mold release lubricant application equipment for the glass bottle forming molds according to either of supplementary note 8 or 9, wherein the application control portion controls the first application portion and the second application portion to conduct mutually different operations from each other.

(Supplementary Note 11)

The mold release lubricant application equipment for the glass bottle forming molds according to supplementary note 10, wherein when the application control portion causes either of the first lubricant application part or the second lubricant application part to conduct mold release lubricant application operation, the lubricant application part that is not applying the mold release lubricant is standby at a predetermined first standby position which is set outside the plurality of sections.

(Supplementary Note 12)

The mold release lubricant application equipment for the glass bottle forming molds according to either of supplementary note 10 or 11, wherein when the application control portion causes either of the first lubricant application part or the second lubricant application part to conduct the mold release lubricant application operation, the first lubricant application part and the second lubricant application part are arranged at the same section, and the lubricant application part that is not applying the mold release lubricant, is standby at a predetermined second standby position which is set to the side of corresponding blank molds or blow molds at the section.

(Supplementary Note 13)

The mold release lubricant application equipment for the glass bottle forming molds according to any of supplementary notes 6 to 12; wherein a glass bottle manufacturing cycle for forming glass bottles and a swab cycle, in which a gob is not charged into the blank mold, are provided in a glass bottle manufacturing portion comprising the blank molds and the blow molds; and the application control portion causes at least either of the first application portion or the second application portion to apply the mold release lubricant during the swab cycle.

(Supplementary Note 14)

A mold release lubricant application equipment for glass bottle forming molds, comprising: a first application portion for applying a mold release lubricant to blank molds for glass bottle forming, a second application portion for applying the mold release lubricant to blow molds for the glass bottle forming, and an application control portion that operates the first application portion and the second application portion in association with each other; wherein the plurality of the blank molds are arranged independently along a predetermined arrangement direction;

the plurality of the blow molds are arranged independently along the arrangement direction;

the first application portion comprises a first lubricant application part for applying the mold release lubricant, and a first transport mechanism for moving the first lubricant application part among the plurality of the blank molds along the arrangement direction;

the second application portion comprises a second lubricant application part for applying the mold release lubricant, and a second transport mechanism for moving the second lubricant application part among the plurality of the blow molds along the arrangement direction;

a plurality of sections comprising the blank molds and the blow molds are formed along the arrangement direction; and the application control portion is configured so as to execute an application operation wherein both the first application portion and the second application portion apply the mold release lubricant, and wherein either of the first application portion or the second application portion applies the mold release lubricant.

(Supplementary Note 15)

The mold release lubricant application equipment for the glass bottle forming molds according to supplementary note 14, wherein the application control portion is configured so as to select either of an application operation, wherein both the first application portion and the second application portion apply the mold release lubricant, or wherein either of the first application portion or the second application portion applies the mold release lubricant.

This application insists on priority based on Japanese patent application 2018-244875 applied for on Dec. 27, 2018, and takes all of the disclosure here.

INDUSTRIAL APPLICABILITY

This invention may be applied as a mold release lubricant application equipment for the glass bottle forming molds.

LIST OF REFERENCE SYMBOLS

4 Spraying equipment (mold release lubricant application equipment)
5 Section
10 Blank mold
18 Blow mold
30A The first spray portion (the first application portion)
30B The second spray portion (the second application portion)
31 Spray control portion (application control portion)
33A The first transport mechanism
33B The second transport mechanism
38A Nozzle (the first lubricant application parts)
38B Nozzle (the second lubricant application parts)
41 (41A, 41B) Abnormal spray detecting portion
42 (42A, 42B) Glass residual detecting portion (sensor)
103 Glass bottle
103 A1 Arrangement direction
L1 Blank mold release lubricant
L2 Blow mold release lubricant
P1 The first standby position
P2 The second standby position

The invention claimed is:

1. A mold release lubricant application equipment for glass bottle forming molds, comprising:
a first applicator to apply a mold release lubricant to blank molds for glass bottle forming,
a second applicator to apply the mold release lubricant to blow molds for the glass bottle forming, and
a controller to operate the first applicator and the second applicator in association with each other; wherein
the plurality of the blank molds are positioned independently along a predetermined arrangement direction;
the plurality of the blow molds are positioned independently along the arrangement direction;
the first applicator comprises a first lubricant applicator to apply the mold release lubricant, and a first transport mechanism to move the first lubricant applicator among the plurality of the blank molds along the arrangement direction;
the first lubricant applicator includes a first nozzle to apply the mold release lubricant, and the first transporter mechanism include a first transport motor to move the first lubricant applicator;
the second applicator comprises a second lubricant applicator to apply the mold release lubricant, and a second transport mechanism to move the second lubricant applicator among the plurality of the blow molds along the arrangement direction;
the second lubricant applicator includes a second nozzle to apply the mold release lubricant, and the second transporter mechanism include a second transport motor to move the second lubricant applicator;
a plurality of sections comprising the blank molds and the blow molds are positioned along the arrangement direction; and
the controller is configured to execute an application operation, wherein at least one of the first applicator and the second applicator apply the mold release lubricant.

2. The mold release lubricant application equipment for the glass bottle forming molds according to claim 1, wherein the controller is configured to select an application operation for each of the sections, wherein at least one of the first applicator and the second applicator apply the mold release lubricant.

3. The mold release lubricant application equipment for the glass bottle forming molds according to claim 1, wherein
when applying the mold release lubricant to both the blank molds and the blow molds at the same section, the controller applies the mold release lubricant to the blank molds via the first lubricant applicator, and then applies the mold release lubricant to the blow molds via the second lubricant applicator.

4. The mold release lubricant application equipment for the glass bottle forming molds according to claim 1, wherein
when the controller causes either of the first lubricant applicator or the second lubricant applicator to conduct mold release lubricant application operation, the controller moves the lubricant applicator that is not applying the mold release lubricant to a first standby position which is set outside the plurality of sections.

5. The mold release lubricant application equipment for the glass bottle forming molds according to claim 1, wherein
when the controller causes either of the first lubricant applicator or the second lubricant applicator to conduct the mold release lubricant application operation,
the first lubricant applicator and the second lubricant applicator are arranged at the same section, and
the lubricant applicator that is not applying the mold release lubricant, is at a second standby position which is set to the side of corresponding blank molds or blow molds at the section.

* * * * *